United States Patent
Wray et al.

(10) Patent No.: US 11,614,335 B2
(45) Date of Patent: Mar. 28, 2023

(54) ROUTE PLANNER OPTIMIZATION FOR HYBRID-ELECTRIC VEHICLES

(71) Applicant: Nissan North America, Inc., Franklin, TN (US)

(72) Inventors: Kyle Hollins Wray, Mountain View, CA (US); Liam Pedersen, San Francisco, CA (US); Richard Lui, Sunnyvale, CA (US); Christopher Ostafew, Mountain View, CA (US)

(73) Assignee: Nissan North America, Inc., Franklin, TN (US)

( * ) Notice: Subject to any disclaimer, the term of this patent is extended or adjusted under 35 U.S.C. 154(b) by 63 days.

(21) Appl. No.: 17/130,392

(22) Filed: Dec. 22, 2020

(65) Prior Publication Data
US 2022/0205796 A1 Jun. 30, 2022

(51) Int. Cl.
*G01C 21/34* (2006.01)
*G01C 21/36* (2006.01)

(52) U.S. Cl.
CPC ..... *G01C 21/3469* (2013.01); *G01C 21/3407* (2013.01); *G01C 21/3492* (2013.01); *G01C 21/3685* (2013.01)

(58) Field of Classification Search
CPC ........... G01C 21/3469; G01C 21/3407; G01C 21/3492
See application file for complete search history.

(56) References Cited

U.S. PATENT DOCUMENTS

| | | | | |
|---|---|---|---|---|
| 5,081,365 A | * | 1/1992 | Field | B60L 58/20 903/946 |
| 6,314,347 B1 | * | 11/2001 | Kuroda | B60W 20/00 701/25 |
| 2007/0294026 A1 | * | 12/2007 | Schirmer | B60W 20/12 340/995.19 |
| 2009/0326750 A1 | * | 12/2009 | Ang | G01C 21/3469 701/1 |
| 2011/0029168 A1 | * | 2/2011 | Talberg | B60W 20/12 903/903 |
| 2013/0116870 A1 | * | 5/2013 | Harty | B60W 20/00 903/903 |

(Continued)

FOREIGN PATENT DOCUMENTS

ES 2395576 * 2/2013 ............ B60W 10/08

OTHER PUBLICATIONS

Ramazanoglu, Fethi and Pretorius, Frans "Spontaneous Scalarization with Massive Fields" Physical Review (Year: 2016).*

(Continued)

*Primary Examiner* — Vivek D Koppikar
*Assistant Examiner* — Godfrey Aleksander Maciorowski
(74) *Attorney, Agent, or Firm* — Young Basile Hanlon & MacFarlane, P.C.

(57) ABSTRACT

Route planning for a hybrid electric vehicle (HEV) includes obtaining a route between an origin and a destination, where the route is optimized for at least one of a noise level or energy consumption of an engine of the HEV that is used to charge a battery of the HEV, and where the route comprises respective engine activation actions for at least some segments of the route; and controlling the HEV to follow the segments of the route and to activate the engine according to the respective engine activation actions.

20 Claims, 12 Drawing Sheets

(56) References Cited

U.S. PATENT DOCUMENTS

| | | | | |
|---|---|---|---|---|
| 2015/0112526 | A1* | 4/2015 | Martin | B60W 20/12 |
| | | | | 701/22 |
| 2017/0080919 | A1* | 3/2017 | Follen | B60W 10/08 |
| 2018/0334157 | A1* | 11/2018 | Tanaka | G01C 21/3469 |
| 2021/0018324 | A1* | 1/2021 | Sujan | G01C 21/3804 |

OTHER PUBLICATIONS

Al-Shammari, Minwir and Masri, Hatem "Multiple Criteria Decision Making in Finance, Insurance and Investment" (Year: 2015).*

Zeng, Xiangrui and Wang, Junmin "A Parallel Hybrid Electric Vehicle Energy Management Strategy Using Stochastic Model Predictive Control With Road Grade Preview" IEEE Transactions on Control Systems Technology vol. 23 No. 6 (Year: 2015).*

M. Araya-López, V. Thomas, O. Buffet and F. Charpillet, "A Closer Look at MOMDPs," 2010 22nd IEEE International Conference on Tools with Artificial Intelligence, Arras, France, 2010, pp. 197-204, doi: 10.1109/ICTAI.2010.101.

Pineda, L., Kyle Hollins Wray and S. Zilberstein. Fast SSP Solvers Using Short-Sighted Labeling. AAA In Proceedings of the Thirty-First AAAI Conference on Artificial Intelligence (2017).

Blai Bonet and Héctor Geffner. 2003. Labeled RTDP: improving the convergence of real-time dynamic programming. In Proceedings of the Thirteenth International Conference on International Conference on Automated Planning and Scheduling (ICAPS'03). AAAI Press, 12-21.

* cited by examiner

ROUTE PLANNER OPTIMIZATION FOR HYBRID-ELECTRIC VEHICLES

TECHNICAL FIELD

This disclosure relates generally to hybrid electric vehicles, and more particularly to engine activation planning for battery charging.

BACKGROUND

A hybrid electric vehicle (HEV) typically includes an electric motor (powered by an electric battery) and a gasoline engine to move the vehicle. The gasoline engine can be used to recharge the battery. Additionally, energy recaptured via regenerative braking can be used to recharge the battery. At any point in time, at least one of the electric motor or the gasoline engine may be used to propel/drive (e.g., control the wheels of) the vehicle.

A key consideration in hybrid vehicles is the engine activation policy used to charge the electric battery. A sub-optimal activation policy may result in, for example, wasted energy, reduction in the life of the battery, and/or increased levels of noise associated with engine activation.

SUMMARY

A first aspect of the disclosed implementations is a method of route planning for a hybrid electric vehicle (HEV). The method includes obtaining a route between an origin and a destination, where the route is optimized for at least one of a noise level or energy consumption of an engine of the HEV that is used to charge a battery of the HEV, and where the route comprises respective engine activation actions for at least some segments of the route; and controlling the HEV to follow the segments of the route and to activate the engine according to the respective engine activation actions.

A second aspect of the disclosed implementations is an apparatus for driver assistance in a hybrid electric vehicle (HEV). The apparatus includes a battery, an engine, and a processor. The processor is configured to, when a driver assistance feature of the HEV is enabled and a destination of the HEV is not known, determining, using a policy of a Markov decision process a next road segment for the HEV and an engine activation action; and, in response to the next road segment being followed by the HEV, activate the engine according to the engine activation action. The engine activation action is selected from a set including a first activation action of turning the engine on and a second activation action of turning the engine off. The first activation action causes the engine to turn on to charge the battery of the HEV.

A third aspect of the disclosed implementations is a non-transitory computer-readable storage medium that includes executable instructions that, when executed by a processor, facilitate performance of operations for route planning in a hybrid electric vehicle (HEV). The operations include obtaining a route that includes respective engine activation actions for at least some segments of the route, which is optimized for at least one of a noise level or energy consumption of an engine of the HEV that is used to charge a battery of the HEV; and controlling the HEV to follow the segments of the route and to activate the engine according to the respective engine activation actions.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

Figure 1:
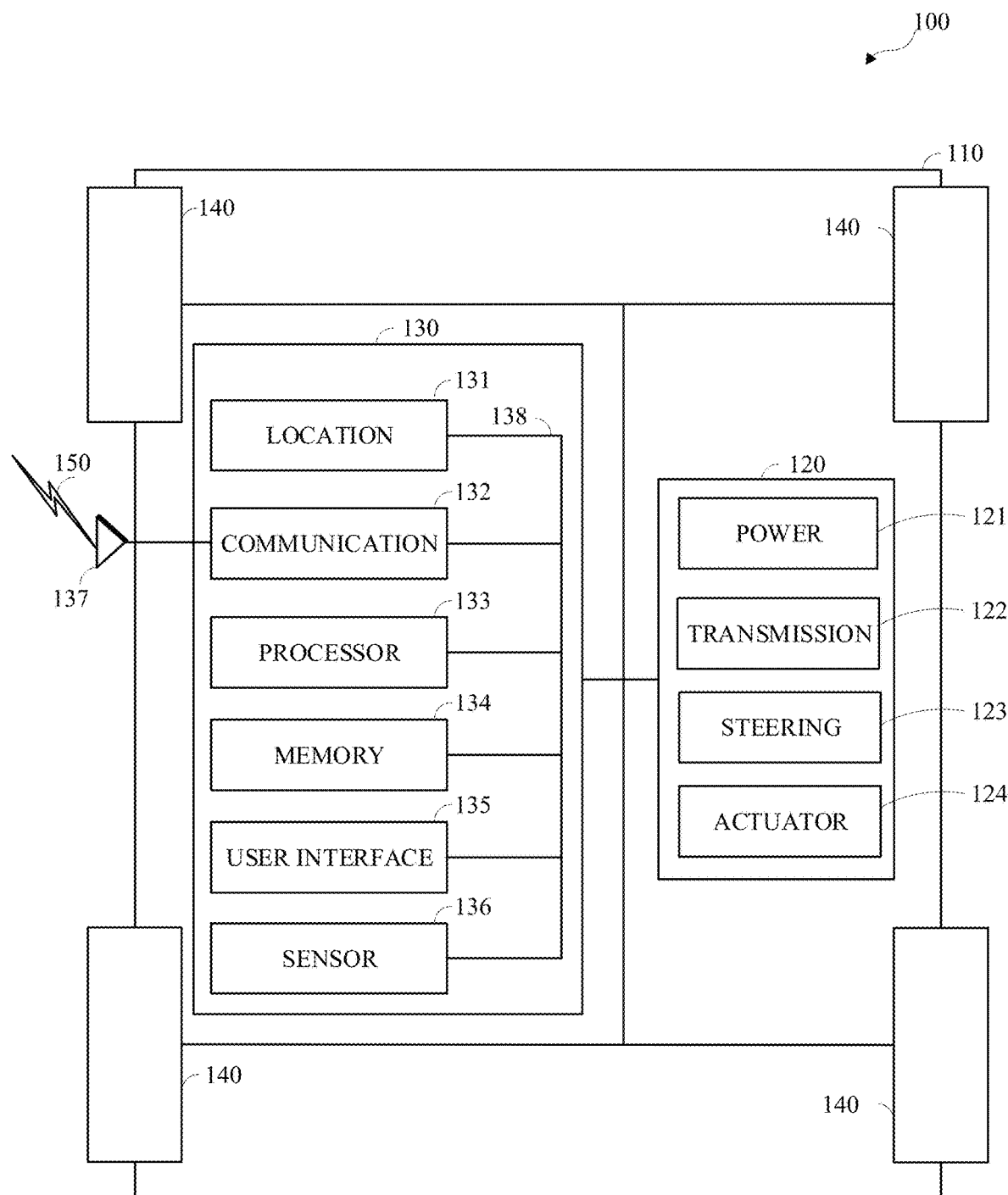
FIG. 1 is a diagram of an example of a vehicle in which the aspects, features, and elements disclosed herein may be implemented.

As mentioned above, a hybrid vehicle typically includes an electric battery (or simply, battery) that may be recharged using power from an engine, such as a gasoline engine or some other internal combustion engine or the like. A consideration with hybrid engines is engine activation. Engine activation refers to how/when to turn on or turn off the engine to recharge the battery.

Described herein are systems and techniques for intelligent engine activation using an engine activation planner (or, for brevity, planner). The planner determines (e.g., calculates, predicts, etc.) an engine activation policy for a vehicle (e.g., an HEV). Even when a route is not known (such as, for example, when a driver gets in the vehicle and starts driving), the planner can make decisions regarding engine activation actions (e.g., whether to turn the engine on or off). The planner can make the decisions using historical patterns of behaviors. The patterns of behaviors can be used to predict where the driver is likely to go (e.g., drive to, etc.) and make the engine activation decisions based on those predictions. As further described below, the policy can be optimized for many different types of objectives.

The patterns of behavior can be those of a single driver (e.g., the current driver of the vehicle), those of different drivers (e.g., multiple drivers of the same vehicle as each may have a different driving profile—one may drive very fast while another may be more conservative), those within a region (e.g., of all drivers/vehicles within the region), other patterns of behaviors, or a combination thereof.

In typical hybrid systems, simple engine activation rules may be employed. For example, engine activation may be based on the state-of-charge (SoC) of the battery under different conditions. To illustrate, a policy may simply attempt to maintain a certain charge range (e.g., [50%, 80%]) of the battery. For example, if the charge of the battery falls below 50%, then the engine can be turned on to recharge the battery; and if the charge of the battery is above 80%, then the engine is not turned on (or is turned off) so that the battery is not further charged. As such, the SoC oscillates in that range and the engine activation rules attempt to maintain homeostasis. While simple, such engine activation approaches (referred to herein as hard-coded rules) are brittle and cannot benefit from predictions.

It is also noted that in a hybrid vehicle, the engine turns on/off seemingly arbitrarily. The engine turns on and off completely disconnected from how the vehicle is being driven. For example, while the vehicle may be traveling on cruise control on an empty highway, suddenly the engine may, from the driver's standpoint, seemingly randomly turn on (to recharge the electric battery) and then stop and do so again at a later point in time. This behavior may be even more noticeable in the series hybrid system, which is described below with respect to FIG. 3, and may be disconcerting to occupants of the vehicle as it is unconnected to the driving state/condition of the vehicle. Thus, an engine activation planner according to implementations of this disclosure can avoid or at least mitigate and minimize such seemingly random behavior.

Additionally, whereas a fully electric vehicle is completely noiseless, the engine of a hybrid vehicle produces noise, which may be undesirable. For example, it may undesirable to generate any noise in residential areas so as to be courteous to the residents whereas turning on the engine in noisy areas (e.g., on highways) may be acceptable. Thus, an engine activation planner according to implementations of this disclosure can minimize engine noise, if/when/where desired.

Furthermore, an engine activation planner according to implementations of this disclosure can anticipate road sections where regenerative braking will be used to recharge the battery and can reduce energy consumption (e.g., by not activating the engine) in anticipation of such areas. For example, if the engine activation planner predicts that a traffic light, a stop sign, or a downhill are coming up along a route of the vehicle, then the engine may not need to be turned on because regenerative braking is predicted to recharge the battery. Thus, in anticipation of a vehicle going over a hill, the engine activation planner can calculate a policy that may turn the engine on when going uphill but then ensure that the battery is relatively discharged by the time that the vehicle is going downhill so that energy can be captured for regeneration.

These and other optimizations can be realized by intelligent planning of engine activations for hybrid electric vehicles (HEVs) according to implementations of this disclosure. Examples of configurations of HEVs are described with respect to FIG. 3. In an example, engine activation planning can be modeled as a type of Markov decision process (MDP): as a multi-objective stochastic shortest path (MOSSP) problem. The MOSSP model can take a vehicle model and a navigation map as input and output an engine activation policy.

In an example, the vehicle model and/or the navigation map can be learned from Global Positioning System (GPS) traces with metadata, and can include topological road structures, traversal speeds/times, battery consumption/regeneration, and/or ambient noise. The metadata can be related to, or have a bearing on, the hybrid-related aspects of the vehicle (e.g., battery charging aspects and/or engine activation actions). For example, the metadata can include one or more of a battery charge (i.e., the SoC), ambient noise, slope, speed, acceleration, gas pedal status, brake pedal status, more, fewer, other metadata, or a combination thereof.

Different engine activation policies can be obtained for different objectives/goals therewith resulting in benefits related to the objectives/goals. A goal can be to minimize total energy consumption, such as based on anticipated hills, stops, and the like. Another goal can be to reduce noise resulting in noise reduction, such as in residential areas. Other goals or combinations of goals are also possible allowing for customizable behavior relating to energy consumption, engine activation, noise levels, and route planning, as further described below. For example, a route selected by a mapping service/application may be based on goals/objectives selected for the engine activation planner and/or related to engine activation.

In actual testing and simulations, an engine activation planner according to implementations of this disclosure has shown, on average, large fuel savings as compared to engine activation based on the simple engine (hard-coded) activation rules described above. Additionally, the engine activation planner is able to intelligently plan for disabling the engine when in quiet residential areas to reduce noise, and enable (i.e., turn on) the engine when an occupant of the vehicle expects it. For example, the vehicle may be stopped at a stop light that then turns green, when the driver presses the accelerator pedal, the driver may want/expect to hear the engine revving up (even though, an HEV may not actually be using the engine to drive the wheels) when the driver has set the HEV to a "sport mode." In such a case, the noise level cost may be set to zero if the vehicle is stopped and the driver floors the acceleration pedal.

Furthermore, the engine activation planner can proactively predict an upcoming potential for regenerative braking (e.g., that, for example, a downhill is upcoming, which enables regenerative braking) and thus will automatically expend battery in expectation of the regenerative braking. These and many other benefits/advantages can be realized with an engine activation planner according to implementations of this disclosure.

Furthermore, in current hybrid electric systems, power generation rules and route planning are disconnected from each other. That is, a route from an origin to a destination is planned without taking into account any objectives related to engine activation. For example, route planning in a vehicle's navigation system does not consider the best routes for a hybrid system to conserve fuel, recharge more battery, or reduce the extra ambient noise. As a result, it is not possible to plan routes that conserve the battery and/or fuel, causing the navigation system to miss out on near equivalent cost-reduced routes. Testing and simulation has shown that the difference in fuel/battery expenditure among near-equivalent routes can be quite dramatic resulting in up to 20% savings in fuel. Thus, in other aspects of this disclosure, a route can be planned while taking into consideration engine activation.

Further details of an intelligent engine activation planner, route planning, and navigation map learning are described herein with initial reference to an environment in which it can be implemented.

FIG. 1 is a diagram of an example of a vehicle in which the aspects, features, and elements disclosed herein may be implemented. In the embodiment shown, a vehicle 100 includes various vehicle systems. The vehicle systems include a chassis 110, a powertrain 120, a controller 130, and wheels 140. Additional or different combinations of vehicle systems may be used. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

The powertrain 120 shown by example in FIG. 1 includes a power source 121, a transmission 122, a steering unit 123, and an actuator 124. Any other element or combination of elements of a powertrain, such as a suspension, a drive shaft, axles, or an exhaust system may also be included. Although shown separately, the wheels 140 may be included in the powertrain 120.

The power source 121 includes an engine, a battery, or a combination thereof. The power source 121 may be any device or combination of devices operative to provide energy, such as electrical energy, thermal energy, or kinetic energy. In an example, the power source 121 includes an engine, such as an internal combustion engine, an electric motor, or a combination of an internal combustion engine and an electric motor, and is operative to provide kinetic energy as a motive force to one or more of the wheels 140. Alternatively or additionally, the power source 121 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 receives energy, such as kinetic energy, from the power source 121, transmits the energy to the wheels 140 to provide a motive force. The transmission 122 may be controlled by the controller 130, the actuator 124, or both. The steering unit 123 may be controlled by the controller 130, the actuator 124, or both and control the wheels 140 to steer the vehicle. The actuator 124 may receive signals from the controller 130 and actuate or control the power source 121, the transmission 122, the steering unit 123, or any combination thereof to operate the vehicle 100.

In the illustrated embodiment, the controller 130 includes a location unit 131, an electronic communication unit 132, a processor 133, a memory 134, a user interface 135, a sensor 136, and an electronic communication interface 137. Fewer of these elements may exist as part of the controller 130. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 is operatively coupled with one or more of the location unit 131, the memory 134, the electronic communication interface 137, the electronic communication unit 132, the user interface 135, the sensor 136, and the powertrain 120. For example, the processor may be operatively coupled with the memory 134 via a communication bus 138.

The memory 134 includes any tangible non-transitory computer-usable or computer-readable medium, capable of, for example, containing, storing, communicating, or transporting machine readable instructions, or any information associated therewith, for use by or in connection with any processor, such as the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 is configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 includes a dedicated short range communications (DSRC) unit, an on-board unit (OBU), or a combination thereof.

The location unit 131 may determine geolocation information, such as longitude, latitude, elevation, direction of travel, or speed, of the vehicle 100. In an example, the location unit 131 includes a GPS unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include both an audio interface for performing audio communication with a person and a touch display for performing visual and touch-based communication with the person. The user interface 135 may include multiple displays, such as multiple physically separate units, multiple defined portions within a single physical unit, or a combination thereof.

The sensors 136 are operable to provide information that may be used to control the vehicle. The sensors 136 may be an array of sensors. The sensors 136 may provide information regarding current operating characteristics of the vehicle 100, including vehicle operational information. The sensors 136 can include, for example, a speed sensor, acceleration sensors, a steering angle sensor, traction-related sensors, braking-related sensors, steering wheel position sensors, eye tracking sensors, seating position sensors, or any sensor, or combination of sensors, which are operable to report information regarding some aspect of the current dynamic situation of the vehicle 100.

The sensors 136 include one or more sensors 136 that are operable to obtain information regarding the physical environment surrounding the vehicle 100, such as operational environment information. For example, one or more sensors may detect road geometry, such as lane lines, and obstacles, such as fixed obstacles, vehicles, and pedestrians. The sensors 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 are combined.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel that is pivoted to a steering angle under control of the steering unit 123, a propelled wheel that is torqued to propel the vehicle 100 under control of the transmission 122, or a steered and propelled wheel that may steer and propel the vehicle 100.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 130 may include the autonomous vehicle control unit.

When present, the autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network information representing the vehicle transportation network, or a combination thereof, and may control or operate the vehicle 100 to traverse the vehicle transportation network in accordance with the route. For example, the autonomous vehicle control unit may output the route of travel to the trajectory controller to operate the vehicle 100 to travel from the origin to the destination using the generated route.

Figure 2:
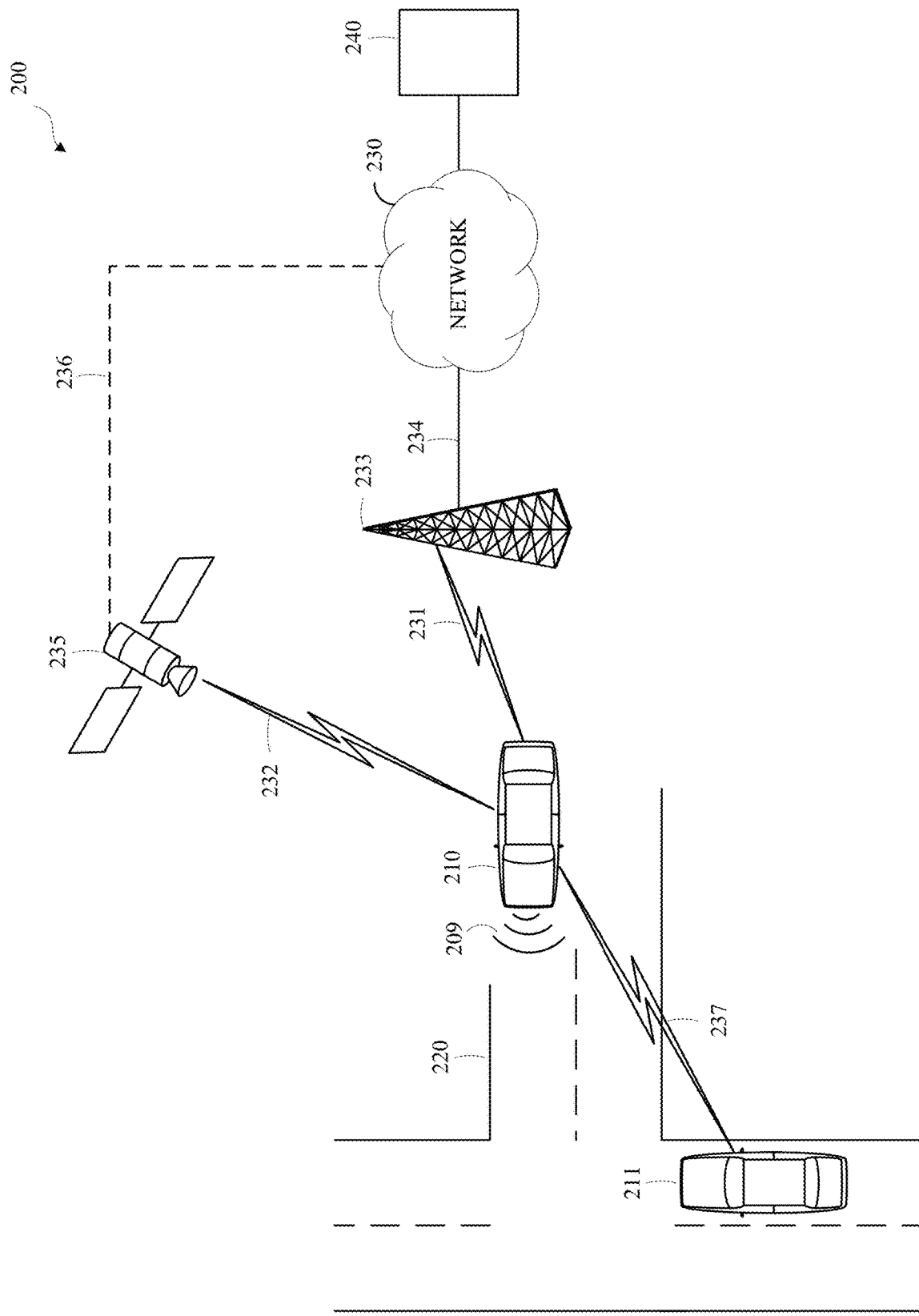
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which travels via one or more portions of the vehicle transportation network 220, and communicates via one or more electronic communication networks 230. Although not explicitly shown in FIG. 2, a vehicle may traverse an off-road area.

The electronic communication network 230 may be, for example, a multiple access system that provides for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. As shown, a vehicle 210/211 communicates via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, an ultraviolet (UV) link, or any link capable of providing for electronic communication.

A vehicle 210/211 may communicate with another vehicle 210/211. For example, a host, or subject, vehicle (HEV) 210 may receive one or more automated inter-vehicle messages, such as a basic safety message (BSM), from a remote, or target, vehicle (RV) 211, via a direct communication link 237, or via a network 230. The remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, is configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 210 may communicate with the communications network 230 via a satellite 235, or other non-terrestrial communication device. The satellite 235, which may include a computing device, is configured to communicate with a vehicle 210, with a communication network 230, with one or more communication devices 240, or with a combination thereof via one or more communication links 232/236. Although shown as a single unit here, a satellite may include any number of interconnected elements.

An electronic communication network 230 is any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 210 may identify a portion or condition of the vehicle transportation network 220. For example, the vehicle includes at least one on-vehicle sensor 209, like the sensor 136 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220.

The vehicle 210 may traverse a portion or portions of the vehicle transportation network 220 using information communicated via the network 230, such as information representing the vehicle transportation network 220, information identified by one or more on-vehicle sensors 209, or a combination thereof.

Although FIG. 2 shows one vehicle transportation network 220, one electronic communication network 230, and one communication device 240, for simplicity, any number of networks or communication devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

Figure 3:
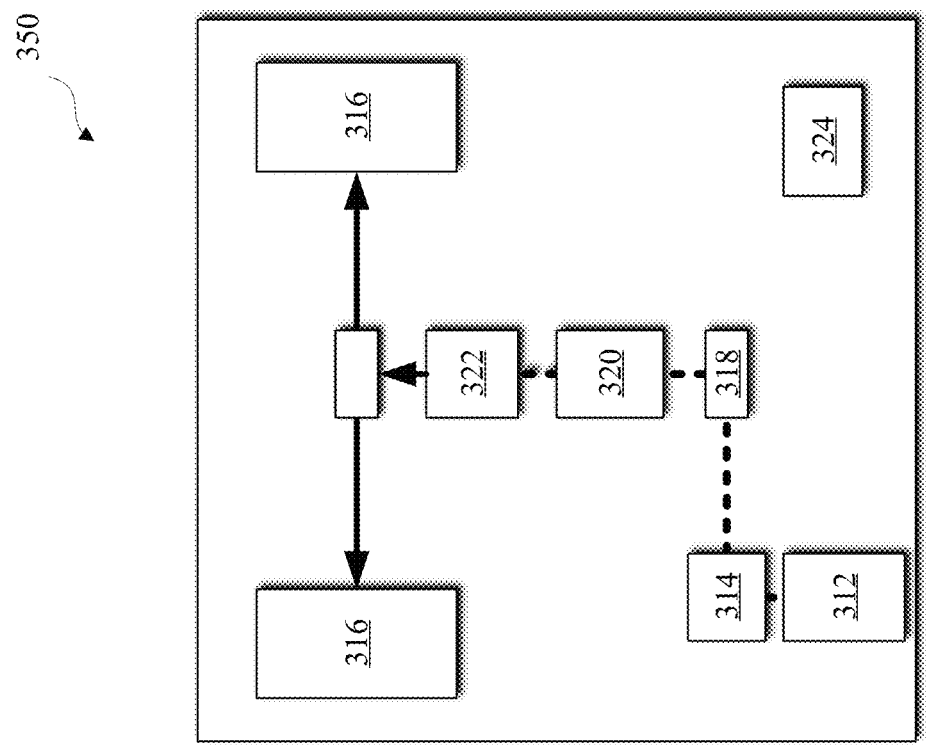
FIG. 3 illustrates examples of configurations of hybrid systems in which the aspects, features, and elements disclosed herein may be implemented.
Figure 3:
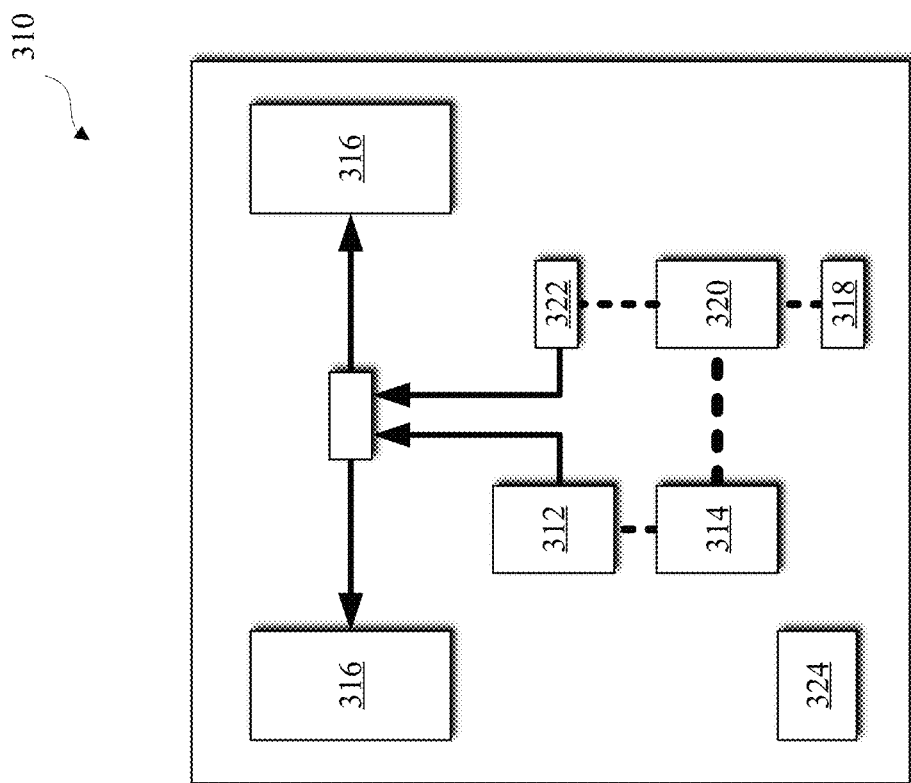

FIG. 3 illustrates examples of different configurations of hybrid systems in which the aspects, features, and elements disclosed herein may be implemented. A configuration 310 illustrates a parallel hybrid system whereas a configuration 350 illustrates a series hybrid system. Other hybrid configurations are also possible. Implementations of engine activation planning according to implementations of this disclosure can be implemented in hybrid systems including those described with respect to FIG. 3. In the configurations 310 and 350, like blocks, even if they perform similar but not necessarily equivalent functions, are numbered with the same numerals to facilitate understanding and ease of comparison between the illustrated configurations.

In the configuration 310, wheels 316 may be driven by an engine 312 (e.g., a gasoline or an internal combustion engine) or an electric motor 322. The engine 312 can be the main source of power. The electric motor 322 transforms electric energy stored in the electric battery 318 into mechanical energy to drive the wheels 316. The electric motor 322 obtains its power from a electric battery 318 via an inverter 320. The electric battery 318 stores electric energy and supplies the energy to the motor as needed. The inverter 320 converts direct-current (DC) stored in the electric battery 318 to alternating-current (AC) power and supplies the resultant AC power to the electric motor 322, which then drives the wheels 316. The inverter 320 can also convert AC power, which may be obtained from a power generator 314, to DC power to recharge the electric battery 318. The power generator 314 produces electricity when driven by the engine 312. The power generator 314 obtains power from the engine 312 and converts the power electricity.

In the configuration 350, the engine 312 is completely disconnected from the drivetrain of the vehicle. The wheels 316 are driven only by the electric motor 322. The electric motor 322 drives the wheels 316. When the vehicle decelerates, energy can captured and stored in the electric battery 318 via regenerative braking. The inverter 320 converts DC and AC to manage the electric power between the electric battery 318 and the electric motor 322.

The electric battery 318 can be a lightweight, compact, high performance battery, such as a lithium ion battery. The engine 312 (e.g., a gasoline engine) generates power that can be used to charge the electric battery 318, which in turn powers the electric motor 322. The electric battery 318 of the configuration 350 is typically relatively smaller than that of the configuration 310. For example, the electric battery 318 of the configuration 350 can be a 2 or 3 kilowatt-hour (kWh) battery. Additionally, the engine 312 of the configuration 350 can be tuned to run at its optimal speeds as compared to the engine 312 of the configuration 310 because the engine 312 of the configuration 350 need not account for, for example, gear shifting whereas the engine 312 of the configuration 310 would.

The engine 312 of the configuration 350, as it can be optimally tuned, may not be as noisy as the engine 312 of the configuration 310 therewith providing an experience that is (in terms of noise and acceleration) practically identical to that of a purely electric vehicle.

A control module 324 of each of the configurations 310 and 350 controls the operation of the vehicle by synchronizing the power sources. For example, the control module 324 can determine when the engine 312 is turned on to recharge the electric battery 318.

The control module 324 of the configuration 310 or the configuration 350 can be or can include a processor, such as the processor 133 of FIG. 1. The control module 324 can execute an engine activation planner that is according to implementations of this disclosure. The engine activation planner can be stored in a memory, such as the memory 134 of FIG. 1, as executable instructions, which when executed by the processor determine an activation action of the engine 312. The activation action can be to turn on the engine 312 to charge the electric battery 318 or to turn off the engine 312 so that it does not charge the electric battery 318. The control module 324 can be implemented using specialized hardware or firmware.

The control module 324 activates the engine according to the activation action. In an example, the control module 324 may directly communicate with (e.g., transmit signals or commands to, etc.) the engine 312 to activate (e.g., turn on or off) the engine 312 according to the activation action. In an example, the control module 324 may transmit the activation action to an engine control module (not shown) that in turns activate the engine 312 according to the activation action.

As mentioned above, engine activation planning can be determined based on model (e.g., an MOSSP) model. An overview of the formal model is now presented.

The model be formally modeled as a tuple $\langle S, A, T, C, s_0, G \rangle$. S can be a finite set of states. A can be a finite set of actions (i.e., a set of engine activation actions). T (i.e., T: $S \times A \times S \rightarrow [0,1]$) can be a state transition function that represents the probability that successor state $s' \in S$ occurs after performing an action $a \in A$ in a state $s \in S$. C(s, a) (i.e., C: $S \times A \rightarrow \mathbb{R}^k$) can represent a multi-cost function that represents the expected immediate cost(s) of performing an action $a \in A$ in state $s \in S$. Thus the cost C can be modeled as a cost vector $\vec{C}(s, a) = [C_1(s, a), \ldots, C_k(s, a)]^T$, where each $C_i(s, a)$ denotes the cost objective i for being in a state s and performing the action a. The symbol $s_0$ denotes an initial state. G denotes the set of goal states such that $\forall a \in A$, $T(s_g, a, s_g) = 1$ and $C(s_g, a) = 0$, which indicates that once a goal state $s_g \in G$ is reached, the system remains in the goal state no matter which action is then taken and that every action taken in the goal state $s_g$ has a cost of 0. The initial state $s_0$ as well as the set of goal states G are provided.

A solution to the model can be a policy $\pi: S \rightarrow A$. That is, under the policy $\pi$, an action a (i.e., $\pi(s)$) is selected for a state s. That is, the policy $\pi$ can indicate that the action $\pi(s) \in A$ should be taken in state s. The policy $\pi$ can include a value function $V^\pi: S \rightarrow C$ that can represent the expected cumulative cost $V^\pi(s)$ of reaching a goal state, $s_g$, from a state s following the policy $\pi$. That is, the value function can provide an expected cost (i.e., a value) for each intermediate state $s_i$, from the start state until a goal state is reached. An optimal policy, $\pi^*$ minimizes the expected cumulative cost. Formally, for the initial state $s_0$, the expected value can be given by formula (1):

$$V(s_0) = \mathbb{E}[\Sigma_{t=0}^\infty C(S_t, A_t) | S_0 = s_0, \pi] \tag{1}$$

In formula (1), $S_t$ and $A_t$ denote, respectively, the random variables of the state and action at time step t. In general, to solve a MOSSP requires that a proper policy exists. A proper policy $\pi$ has the properties: (1) there exists a policy that reaches a goal with probability 1, and (2) all states that do not reach the goal with probability 1 result in an infinite cost.

In an example, a scalarization function can be used to convert the model/problem into a shortest path optimization problem (SSP). That is, a single value indicating the long term utility of a next immediate action can be obtained using the scalarization function, which combines the expected costs to obtain the single value. Formally, the scalarization function $f: \mathbb{R}^k \rightarrow \mathbb{R}$ can be such that, with respect to the single value, $f(V(s)) = V_f(s)$ and, with respect to the cost functions, $f(C(s)) = C_f(s)$. In an example, the scalarization function can be a weighted sum of the objectives or a non-linear function of the objectives. Different weights can be used depending on the desired optimization.

For example, assuming that at least two objectives are possible: a first objective is to minimize noise and a second objective is to minimize wasted energy. Wasted energy can result, for example, when the battery is at a certain capacity (e.g., 100%) and can't be charged further by available energy from regenerative braking. Thus, the available energy is wasted energy. Depending on which of the objectives is selected (such as by default or by the driver) as the more important or primary goal, different weights can be assigned to each of the first and second costs associated with the objectives. In an example, the scalarization function can be a weighting the total energy plus a very small constant factor for noise and wasted energy and the toggling of the engine. Examples of objectives and costs are further described below.

In another example, constrained optimization can be used where a respective budget (e.g., a range, a maximum, a minimum) can be set for each of the costs and where the costs can be ranked in terms of importance. For example, a single objective (e.g., minimize noise or maximize energy efficiency) can be set as a primary objective to be optimized. A preference ordering graph with slack variables $\delta(e) \geq 0$ can be used. A multi-objective algorithm can consider each objective in a particular order. The algorithm can constrain the available actions and/or policies for subsequent objectives following the particular order. For example, for a first objective, a set of actions A(s) can be kept (e.g., maintained, etc.) for each state s. Only the actions that are within some slack in value $(V_1^*(s) - Q_1^\pi(s, a) \leq \delta_1$; where $\delta_1$ can be a user-defined slack amount that signifies "allowable deviation from optimal to improve other objectives") can be kept in the action set A(s) for each state. The second objective in the ordering can then solve its objective while being constrained to the available actions/policies that the first objective limited its access to. This process repeats until all objectives have been examined.

Again, the solution of the model is a policy $\pi$ that minimizes the expected costs of the initial state, governed by the Bellman optimality equation, which for a scalarization function, can be given by formula (2):

$$V_f(s) = \min_{a \in A}\left(C_f(s, a) + \sum_{s' \in S} T(s, a, s') V_f(s')\right) \quad (2)$$

The Bellman optimality equation of formula (2) can be used to evaluate the expected reward relative to the advantage or disadvantage of each future state and can be summarized as performing the following. Given a current state s, and assuming that the best possible action a is taken at the current time step and at each subsequent time step, what long-term reward (i.e., value $V_f(s)$) can be expected? For the actions available in a state, the action that minimizes the value is then selected. The reward/cost, $C_f(s, a)$, of the optimal action a in state s is added to discounted values of possible future states s'. The multiplier T(s, a, s') is used as a discounting factor that diminishes the reward over time. While in formula (2) the minimum value is selected as the best value, in some situations (e.g., depending on the cost functions selected) the best value may be the maximum value.

The MOSSP can be solved using any one of several available techniques. In an example, the MOSSP can be solved by applying formula (2) until convergence. In another example, a technique that leverages heuristic search and Monte Carlo sampling in order to intelligently explore the state space can be used. One such technique is called Labeled Real-Time Dynamic Programming (LRTDP) and is described in Bonet B. and Geffner H., "Labeled RTDP: Improving the convergence of real-time dynamic programming," in Proceedings of the 13$^{th}$ International Conference on Automated Planning and Scheduling, 2003, pp. 12-21.

A key idea of LRTDP is to assume an optimistic (e.g., lower) bound on the value of each state upon first visiting the state. Formally, this is called a heuristic and is denoted by $h_f(s) \leq V_f^*(s)$ for s E S. In the above MOSSP formulation, the simplest heuristic can be a zero heuristic with $h_f(s)=0$.

In another example, and using a heuristic, the MOSSP can be solved using a technique referred as Fast LAbeling from REsiduals using Sampling (FLARES), which is an approximation of the LRTDP and which is described in Pineda, L., Wray, K. H., and Zilberstein, S., "Fast SSP solvers using short-sighted labeling," in Proceedings of the 31st 12I Conference on Artificial Intelligence, 2017, pp. 3629-3635.

With FLARES, the MOSSP can be solved by starting at the initial state $s_0$. An action $a_t$ is then selected by applying the Bellman optimality equation of formula (2); using the heuristic $h_f(s')=V_f(s')$ when a new state is first visited, randomly sampling a successor state from $s_{t+1} \sim T(s_t, a_t, .)$; and terminating when a goal state $s_g \in G$ is reached.

An engine activation planner according to this disclosure can plan an engine activation (i.e., an activation action) for each possible state that could arise. As a vehicle drives, the plan can be further refined. That is, given a current position of the vehicle, the engine activation planner can plan whether an engine, such as the engine 312 of FIG. 3, should be turned on or off to charge a battery of the vehicle. In an example, the engine activation planner can use driving patterns of a navigation map.

The navigation map can include learned historic driving patterns. The navigation map can include learned final goal (e.g., destination) locations. The historic driving patterns can be those of a particular vehicle an activation plan (e.g., policy) is to be calculated for by the engine activation planner, of a particular driver of the particular vehicle, or of an aggregated learned historic driving patterns of several vehicles.

Before further describing the constituents of the tuple (S, A, T, C, $s_o$, $s_G$) of the MOSSP, vehicle parameters and a navigation map used to build the MOSSP model are first described.

The vehicle parameters can be or can include any relevant vehicle-specific information that can be used by in the MOSSP for engine activation planning. The vehicle-specific parameters can be selected based on the hybrid configuration. For example, the vehicle parameters used for a series hybrid (e.g., the configuration 350 of FIG. 3) may include additional, fewer, and/or other parameters than those used with a parallel hybrid (e.g., the configuration 310 of FIG. 3).

Table I lists some such vehicle parameters. In an example, the parameters of Table I can be used with a series hybrid. More, fewer, other vehicle specific-parameters, or a combination thereof can be used. The vehicle parameters can depend on the hybrid configuration. For example, in a parallel hybrid configuration, such as the configuration 310 of FIG. 3, as the engine is also used to control the vehicle, at least the noise model (such as due to complex shifting and transmission) and fuel consumption model (e.g., to drive the vehicle and to recharge the battery) may be modeled differently than as described with respect to Table I.

TABLE I

| Parameter Name | Units | Parameter |
|---|---|---|
| Battery Capacity | kWh | $\theta_{bc}$ |
| Auto Engine On/Off Battery Level Range | [kWh, kWh] | [$\underline{\theta}_{ae}$, $\overline{\theta}_{ae}$] |

TABLE I-continued

| Parameter Name | Units | Parameter |
| --- | --- | --- |
| Auto Engine On/Off Speed | km/h | $\theta_{ae}$ |
| Engine Battery Charge Power | kW | $\theta_{ep}$ |
| Engine Fuel Tank Capacity | L | $\theta_{ft}$ |
| Engine Fuel Consumption | L/100 km | $\theta_{fc}$ |
| Engine Fuel Efficiency | % | $\theta_{fe}$ |
| Engine Noise | dB | $\theta_{en}$ |

The battery has a capacity $\theta_{bc}$ (which may be small, such as 2 kWh to 3 kWh) that charges (such as from the engine) at a power $\theta_{ep}$ kW. When activated, the engine, which has a fuel capacity of $\theta_{ft}$ Liters, generates a baseline amount of noise $\theta_{en}$ dB. The engine can be activated within the range $[\underline{\theta}_{ae}, \overline{\theta}_{ae}]$. However, if the battery level falls below the lower end $\underline{\theta}_{ae}$ of range, then the engine is turned on; and if the battery level reaches above the higher end $\overline{\theta}_{ae}$ of the range, then the engine is turned off. Additionally, the engine turns on when the vehicle is traveling at speeds higher than the speed $\theta_{ae}$ kilometers/hour. The rules associated with the range $[\underline{\theta}_{ae}, \overline{\theta}_{ae}]$ and/or the speed $\theta_{ae}$ can be the hard-coded rules, as described above. When the engine is on, it expends fuel at an efficiency $\theta_{fe}$%, consuming the fuel at a rate of $\theta_{fc}$ Liters/100 km.

In an example, the vehicle parameters may be known a priori. In another example, the vehicle parameters can be learned. In an example, respective constants can be learnt for at least some of these parameters by averaging each over time. Thus, values corresponding to at least some of these vehicle parameters can be collected from the vehicle over time and then averaged. In an example, respective functions can be fit to at least some of these vehicle parameters. For example, the engine battery charge power $\theta_{ep}$ may be better described as a function of a current battery level, speed, and road slope.

The navigation map can be defined as a directed graph $\langle V, E \rangle$ of vertices V and edges E. Each vertex v∈V can have the parameters: id, latitude, longitude, and altitude, as shown in Table II. Each vertex v defines a coordinate in space as well as a unique identifier (Id). The vertices can have fewer, more, other parameters, or a combination thereof.

TABLE II

| Parameter Name | Units | Parameter |
| --- | --- | --- |
| Id | — | $v_{id}$ |
| Latitude | degrees | $v_{lat}$ |
| Longitude | degrees | $v_{lon}$ |
| Altitude | m | $v_{alt}$ |

Each edge e∈E can have the parameters listed in Table III. An edge e connects two vertices. As such, an edge e can have the parameters From Vertex Id (which identifies a first node), To Vertex Id (which identifies a second node), a unique Id, and semantic road traversal information usable by the engine activation planner. In an example, the semantic road traversal information useful for engine activation planning can include one or more of the following parameters. A parameter $e_{ntt}$ denotes the number of times that the edge has been traversed. A parameter $e_{as}$ denotes the average speed of all the traversals of the edge. A parameter $e_{abcr}$ denotes the average battery consumption/regeneration, which refers to all non-stop driving along the edge. The average battery consumption/regeneration $e_{abcr}$ automatically incorporates the consequences of slope of the edge, road type of the edge, and traffic on the edge by simply recording, on average, how much change in battery level there was after traversal. A vertex also independently models full stops, denoting how many times a stop occurred $e_{nts}$, the duration of the stop $e_{ast}$, and how the average battery level changes from regenerative braking $e_{abrs}$. The parameter $e_{aan}$ captures the average ambient noise along the edge.

TABLE III

| Name | Units | Parameter |
| --- | --- | --- |
| id | — | $e_{id}$ |
| From Vertex Id | — | $e_{from}$ |
| To Vertex Id | — | $e_{to}$ |
| Number of Times Traversed | — | $e_{ntt}$ |
| Number of Times Stopped | — | $e_{nts}$ |
| Average Speed | km/h | $e_{as}$ |
| Average Traversal Time | h | $e_{att}$ |
| Average Stop Time | h | $e_{ast}$ |
| Average Battery Consumption/Regeneration | kWh | $e_{abcr}$ |
| Average Battery Regeneration On Stop | kWh | $e_{abrs}$ |
| Average Ambient Noise | dB | $e_{aan}$ |

In an example, the navigation map can be obtained (e.g., learned, acquired, purchased, leveraged, used, etc.). The navigation map may be purchased from a third party that maintains such information. The navigation map can be learned as a vehicle is traversing the roads. In an example, the navigation map may be an obtained navigation map that is updated by the driving history. The navigation map may be available as a callable service (such as a cloud-based service), which the engine activation planner can programmatically call to request navigation map information that the planner requires.

In some implementations, some of the parameters of the navigation map may have different semantics than those described above. To illustrate, for example in the case of a purchased navigation map, the Number of Times Traversed may be given in the form of a probability. The probability can also be computed from, for example, the number of times traversed and a number of all outgoing edges.

In an example, the driving history can be captured, and the navigation history can be learned from GPS traces. A GPS trace can be defined as a vector $\vec{g} = \langle g_1, \ldots, g_{|\vec{g}|} \rangle$ of GPS locations along a driving path of the vehicle; and the set of all GPS traces is the set G. For each GPS trace, which are discrete points, each $\vec{g}_i, \vec{g}_j \in G$ are paired for each contiguous road segment length that is within a pre-defined tolerance $d_{tol} > 0$ from one another. In an example, the pre-defined tolerance $d_{tol}$ can be 100 meters. However, other lengths are possible. The average of the beginning and end points in the segment of $\vec{g}_i$ and $\vec{g}_j$ forms two vertices. An edge can then be added to the navigation map that contains the parameters of the navigation map, such as those described above with respect to Table III. That is, an edge that is added to the navigation map can average all recorded speeds, battery consumption, etc. along the segments. Adding edges to the navigation can also include adding vertices corresponding to the vertices.

It is noted that Average Battery Consumption/Regeneration can be stochastic based at least on (1) the branching statistical distribution of edge traversal times (further described below) of a navigation map, (2) multiple possible routes splitting and joining to reach the same goal, and (3) regenerative braking during stochastic stops in slow traffic and traffic lights. Thus the battery level at any upcoming navigation map edge can have an associated probability distribution. This stochastic process can be naturally modeled as a Markov chain; however, actions (such as turning on or off the engine) can affect the battery level. Thus, the MOSSP, which is a generalization of a MDP, can more accurately model the engine activation planning process.

In an example, the navigation map can include two parts. A first part that can be fixed (e.g., purchased, static, unchangeable) and can include parameters such as Average Speed and the like. A second part can be a learned part and is necessary for determining an optimal engine activation plan. The second part of the navigation map can be unique to a particular vehicle (or a particular driver of the vehicle). Using this information, the planner can create the optimal plan without knowing the destination of the vehicle.

If the vehicle's destination is known (such as when a driver enters a destination in a routing application), then an optimal engine activation plan can be determined deterministically. When the destination is known, the navigation map structure can be easily derived (such as from the routing application). The optimal engine activation plan can be easily derived because the planner knows what to expect (e.g., a hills, residential areas, highway, traffic signs, etc.) along the way.

When the destination is not known, then the planner plans over the space of all (e.g., sampled) possible routes that the vehicle may take including all (e.g., sampled) possible destinations. To make the problem more tractable, information regarding which routes (i.e., edges) the vehicle has taken, the Number of Times Traversed (and/or Probability of Taking), and the like can be accumulated in the second part of the navigation map.

The constituents of the tuple $\langle S, A, T, C, s_o, s_G \rangle$ of the MOSSP can now be further described.

The state space can be defined as $S = S_e \times S_{bl} \times S_{es}$. $S_e = E$ is the set of edges in the navigation map. As such, $S_e$ can be the set of roads (or more accurately, road segments) in a navigation map, which is further described below. The set of roads $S_e$ can be the set of roads that the vehicle has historically driven. $S_{bl} \subset [0, \theta_{bc}]$ is the current battery level (in kWh), which can be in the range of 0 to the total battery capacity $\theta_{bc}$ kWh. The current battery level can be discretized at a regular interval/resolution. For example, given a discretization resolution of 30, the current battery capacity can be one of the values of the set $$S_{bl} = \left\{ \frac{0}{30} \bar{\theta}_{bc}, \frac{1}{30} \bar{\theta}_{bc}, \ldots, \frac{30}{30} \bar{\theta}_{bc} \right\}.$$

$S_{es}$ is the current engine status, which can be off or on: $S_{es} = \{\text{off, on}\}$.

Other factors can be considered/included in the state space. For example, one or more parameters of the navigation map can be included/considered in the state space. For example, ambient noise, degree of traffic, and/or other factors can be part of the state space S. In an example, the degree of traffic may be an ordinal variable having values such as ("light", "average", "heavy"). For example, factors related to noise level in the car and/or current power usage (such as whether an entertainment system (e.g., a radio) of the vehicle is on/off and/or whether the air conditioner/heater of the vehicle is on/off) can be considered in the state space. When for example, the radio is on, the driver may not hear the engine being turned on. Furthermore, the scheduling of the engine activation can be based on the type of music (e.g., heavy metal, classical, easy listening, etc.) that is playing.

The action space A is the set of activation actions of the engine. The MOSSP selects one of the activation actions (e.g., whether to turn the engine on or off) for a next edge of the navigation map to be traversed immediately following the current edge. Thus, in an example, the action space is $A = \{\text{off, on}\}$. If the engine is currently in a state $s_{es} \in S_{es}$ and the next activation action sets the engine to the same state, then no action may be performed on the engine. That is, the current state is not changed.

In an example, the action space A can include other actions related to other power-consuming components of the vehicle. In an example, if the radio is already turned on, then to mask the noise related to turning the engine on, the planner may select an action to increase the volume of the radio. In an example, an action selected by the planner may be to lower the air conditioner of the vehicle in order to reduce the amount of battery power consumption.

The initial state $s_0 = \langle s_{0e} \times s_{0bl} \times s_{0es} \rangle$ includes the starting vehicle location edge $s_{0e} \in E$; the current battery level $s_{0bl} \subset [0, \theta_{bc}]$, and the current engine status $s_{0es}$ (e.g., whether the engine is off or on).

The goal states $s_g = \langle s_{ge} \times g \times s_{ges} \rangle \in G$ can be any state that has a self-looping edge in the navigation map, denoting the end of learned GPS traces. Formally, the set of goal states are $G = \{s_g \in S | \exists e \in E \text{ s. t. } e_{to} = s_{ge} \hat{} e_{from} = s_{ge}\}$.

The transition function T can include capturing the movement in (e.g., according to, etc.) the edges of the navigation map, the change in battery level, and the change in engine status based on the navigation map and the activation action performed. For any normal state $s \in S - G$ (i.e., a non-goal state), the state transition for an action a can have the three components of formula (3), which are multiplied together:

$$T(s, a, s') = T_e(s, a, s') T_{bl}(s, a, s') T_{es}(s, a, s') \quad (3)$$

The first component (i.e., $T_e(s, a, s')$) governs how the location changes following the topological graph of the navigation map formed by various from $e_{from}$ to $e_{to}$ vertices. The location changes can be stochastic or deterministic. If a destination of a route is known (such as when a driver provides a destination and a route is calculated from a current location to the destination), then the location changes can be deterministic according to the route (i.e., the topological graph of the navigation map). On the other hand, if the destination is unknown, then the location changes can be stochastic according to a learned topological graph of the navigation map. To this end, let the neighboring successor edges (i.e., roads) of state s be $N(s) = \{e \in E | e_{from} = s_{e,to}\}$. The first component $T_e(s, a, s')$ can be given by formula (4):

$$T_e(s, a, s') = \begin{cases} \frac{s'_{e,ntt}}{\sum_{e \in N(s)} e_{ntt}}, & \text{if } s_{e,to} = s'_{e,from} \\ 0, & \text{otherwise} \end{cases} \quad (4)$$

Formula (4) can be intuitively explained as: the engine activation planner considers the likelihood of navigating on a successor road given the current road to be equal to the learned patterns of routes that the driver has historically driven in the past.

The second component (i.e., $T_{bl}(s, a, s')$) governs how the battery level changes stochastically following the energy consumption/regeneration $s_{e,abcr}$ of the learned navigation map edge $s_e$, the average traversal time $s_{e,att}$, the engine activation action a∈ A, the engine battery charge power $\theta_{ep}$, the (learned) number of times stopped $s_{e,nts}$, the (learned) number of traversal times $s_{e,ntt}$, and the average regeneration on a stop $s_{e,abrs}$. When the batter level $S_{bl}$ is discretized, as described above, the modeled change in $s^*_{bl}$ can be computed using formula (5).

$$s^*_{bl} = \begin{cases} s_{bl} + s_{e,abcr} + \dfrac{s_{e,nts}}{s_{e,ntt}} s_{e,abrs}, & \text{if } s_{es} = \text{off} \\ s_{bl} + s_{e,abcr} + \dfrac{s_{e,nts}}{s_{e,ntt}} s_{e,abrs} + \dfrac{s_{e,att}}{s_{e,ntt}} \theta_{ep}, & \text{if } s_{es} = \text{on} \end{cases} \quad (5)$$

Using $s^*_{bl}$, the second component (i.e., $T_{bl}(s, a, s')$) can be probabilistically mapped to a discrete next battery level $s'_{bl}$ using formula (6). In formula (6), $\underline{s}^*_{bl}$, $\overline{s}^*_{bl} \in S_{bl}$ are the nearest lower and the nearest upper battery level state factors from $s^*_{bl}$ in $S_{bl}$, respectively.

$$T_{bl}(s, a, s') = \begin{cases} 1 - \dfrac{s^*_{bl} - \underline{s}^*_{bl}}{\overline{s}^*_{bl} - \underline{s}^*_{bl}}, & \text{if } s'_{bl} = \underline{s}^*_{bl} \\ \dfrac{s^*_{bl} - \underline{s}^*_{bl}}{\overline{s}^*_{bl} - \underline{s}^*_{bl}} & \text{if } s'_{bl} = \overline{s}^*_{bl} \end{cases} \quad (6)$$

The third component (i.e., $T_{es}(s, a, s')$) governs the change in engine status based on the action a, as well as any hard-coded automatic engine on/off range $[\underline{\theta}_{ae}, \overline{\theta}_{ae}]$, and engine on/off speed $\theta_{ae}$. The third component (i.e., $T_{es}(s, a, s')$) can be calculated using formula (7):

$$T_{es}(s, a, s') = \begin{cases} 1, & \text{if } ((s_{e,as} > \theta_{ae}) \wedge (s'_{es} = \text{on})) \\ & \vee ((s_{e,as} \leq \theta_{ae}) \wedge (s_{bl} < \underline{\theta}_{ae}) \wedge (s'_{es} = \text{on})) \\ & \vee ((s_{e,as} \leq \theta_{ae}) \wedge (s_{bl} > \overline{\theta}_{ae}) \wedge (s'_{es} = \text{off})) \\ & \vee ((s_{e,as} \leq \theta_{ae}) \wedge (s_{bl} \in [\underline{\theta}_{ae}, \overline{\theta}_{ae}]) \wedge (s'_{es} = a)) \\ 0, & \text{otherwise} \end{cases} \quad (7)$$

Formula (7) can be intuitively explained as modeling the hard-coded engine behavior. The engine automatically turns on when the speed is high, which is a necessity when the electric motor draws a large amount of power. The engine automatically turns off or on when the battery capacity is too high or too low, respectively, for long term vehicle and battery health. Otherwise, the engine follows activation requests via the action of the MOSSP policy.

For a goal state $s_g \in G \subset S$ and an action a, the transition function, $T(s_g, a, s')$ can be calculated using formula (8).

$$T(s_g, a, s') = \begin{cases} 1, & \text{if } s' = s_g \\ 0, & \text{otherwise} \end{cases} \quad (8)$$

Formula (8) simply defines goal states as self-looping, absorbing states.

With respect to the costs C, several cost factors/functions can be considered. At least a subset of the following costs can be considered: total energy (kWh), wasted energy (kWh), battery regenerated (kWh), battery consumed (kWh), fuel consumed (L), engine toggled, engine auto toggled, time to traverse the edge (e.g., the expected time it takes to drive on the edge), and extra noise. Other costs are also possible. While the objective of the MOSSP is to minimize the expected costs over time, the cost functions are the costs associated with a next immediate one-step cost of a next activation action.

A primary cost can be energy expenditure (in kWh). The energy expenditure can factor in the battery consumption or regeneration of traversing an edge (road) in the navigation map, the expected energy gains of regenerative braking, and the cost of fuel spent to regenerate the battery when using the engine (i.e., gas-powered). In addition to energy expenditure, the wasted energy (in kWh) can be measured. The wasted energy can represent the energy that could have been regenerated beyond the capacity of the battery, such as can happen on a long downhill road or to come to a stop at a traffic light. The toggling of the engine from off to on or from on to off is also a cost, as toggling can be both inefficient and jarring to the driver or other occupants of the vehicle. Another cost that can be considered is the amount of extra noise (in dB) that is generated beyond the learned average noise level of the ambient environment's average noise level. At least some of these costs (e.g., all of these costs) can be factored into the objective function and minimized by the engine activation planner.

In an example, the cost vector can be defined as:

$$\vec{C}(s,a) = [C_{te}(s,a), C_{we}(s,a), C_{et}(s,a), C_{en}(s,a)]^T \quad (9)$$

The first component, $C_{te}(s, a)$, is the expected energy expenditure; the second component, $C_{we}(s, a)$, is the expected wasted energy; the third component, $C_{et}(s, a)$, is the expected value of the engine switching; and the fourth component, $C_{en}(s, a)$, is the amount of extra noise that is generated if the engine is activated.

The expected energy expenditure, $C_{te}(s, a)$, can be calculated as follows. First the contribution of the engine status $\epsilon_{es}(s, a)$, and expected regeneration from any regenerative braking $\epsilon_{rb}(s, a)$ are computed.

The contribution of the engine status $\epsilon_{es}(s, a)$ can be computed using formula (10) as the product of the Engine Battery Charge Power $\theta_{ep}$ and the average traversal time (e.g., expected time) $s_{e,att}$ of the road segment (edge) of the navigation map when the engine is on (i.e., the engine status $s_{es}$ is equal to on); and 0 otherwise (i.e., when the engine is off).

$$\epsilon_{es}(s, a) = \begin{cases} \theta_{ep} s_{e,att}, & \text{if } s_{es} = \text{on} \\ 0, & \text{otherwise} \end{cases} \quad (10)$$

The expected regeneration from any regenerative braking $\epsilon_{rb}(s, a)$ can be computed using formula (11), which describes the expected regeneration while stopping if the vehicle stops and can be computed as the average regeneration on stop, $s_{e,abrs}$, multiplied by the ratio of the number of times stopped on the edge $s_{e,nts}$ to the number of traversal times of the edge $s_{e,ntt}$—the ratio represents the probability of stopping on the edge.

$$\epsilon_{rb}(s, a) = \dfrac{s_{e,nts}}{s_{e,ntt}} s_{e,abrs} \quad (11)$$

The expected new battery level $b_l(s, a)$ and the expected battery consumption $b_c(s, a)$ can now be computed using, respectively, formula (12) and formula (13). The expected new battery level $b_l(s, a)$ can be computed using formula (12) as the sum of the current battery level $s_{bl}$, the energy consumption/regeneration $s_{e,abrs}$, contribution of the engine status $\epsilon_{es}$(s, a), and the expected regeneration from any regenerative braking $\epsilon_{rb}$(s, a). The expected battery consumption $b_c$(s, a) can be computed as the maximum of 0 and the negative of energy consumption/regeneration $s_{e,abrs}$.

$$b_l(s,a) = s_{bl} + s_{e,abcr} + \epsilon_{es}(s,a) + \epsilon_{rb}(s,a) \quad (12)$$

$$b_c(s,a) = \max\{0, -s_{e,abcr}\} \quad (13)$$

The wasted energy $\epsilon_{we}$(s, a) can then be computed as any excess battery level that would have gone above the battery capacity $\theta_{bc}$ using formula (14).

$$\epsilon_{we}(s,a) = \max\{0, b_l(s,a) - \theta_{bc}\}$$

Now, given the battery level and the wasted energy, the battery regeneration $b_r$ (s, a) amount can be computed using equation (14).

$$b_r(s,a) = \max\{0, \max\{0, s_{e,abcr}\} \epsilon_{es}(s,a) + \epsilon_{rb}(S,a) - \epsilon_{we}(s,a)\} \quad (14)$$

The total energy can also include how much fuel was spent regenerating the battery. The amount of energy contribution from fuel used to power the engine, $\epsilon_{fe}$(s, a), is proportional to the ratio of generated energy of the engine ($\theta_{ep} s_{e,att}$) to the engine's efficiency ($\theta_{fe}$) in conversion of fuel to energy stored in the battery:

$$\epsilon_{fe}(s, a) = \frac{\theta_{ep} s_{e,att}}{\theta_{fe}} \quad (15)$$

The total energy cost $C_{te}$(s, a) can now be computed, using formula (16), as the battery energy consumed ($b_c$(s, a)) minus the battery energy regenerated ($b_r$(s, a)) plus the fuel energy expended as part of any engine activation ($\epsilon_{fe}$(s, a)).

$$C_{te}(s,a) = b_c(s,a) - b_r(s,a) + \epsilon_{fe}(s,a) \quad (16)$$

The expected wasted energy, $C_{we}$(s, a), can be computed as described above with respect to wasted energy, $\epsilon_{we}$(s, a):

$$C_{we}(s,a) = \epsilon_{we}(s,a) \quad (17)$$

The expected value of the engine switching, $C_{et}$(s, a), can be calculated as the probability that the engine will toggle using formula (18):

$$C_{et}(s,a) = \Sigma_{s' \in S} T(s,a,a')[s_{es} \neq s'_{es}] \quad (18)$$

In formula (18), $[s_{es} \neq s'_{es}]$ is an Iverson bracket. That is, $[s_{es} \neq s'_{es}]$ evaluates to 1 if the current state is different from the next state, indicating that the engine is expected to toggle; and evaluates to 0 if the current state is equal to the next state, indicating that the engine is not expected to toggle. The expected value of the engine switching, $C_{et}$(s, a), weighs the probability of the selected action a intentionally toggling the engine as well as the automatic toggling of the engine as governed by the hard-coded Auto Engine On/Off Speed $\theta_{ae}$ and the Auto Engine On/Off Battery Level Range [$\underline{\theta}_{ae}, \overline{\theta}_{ae}$].

The amount of extra noise that is generated if the engine is activated, $C_{en}$(s, a), combines two separate noise values: 1) the ambient noise, $s_{e,aan}$, which may be a learned ambient noise on navigation map edge the e and 2) the Engine Noise $\theta_{en}$. As is known two noise levels $\eta_1$ and $\eta_2$ are not directly additive. Rather, a standard acoustics function $g(\eta_1, \eta_2)$ as in formula (19) can be used to "add" them:

$$g(\eta_1, \eta_2) = 10 \log_{10}\left(10^{\frac{\eta_1}{10}} + 10^{\frac{\eta_2}{10}}\right) \quad (19)$$

As such, given the expected (learned) ambient noise on edge $s_{e,aan}$ and the vehicle's engine's noise $\theta_{en}$, the extra noise above the average ambient levels generated when the engine is on is governed by formula (20):

$$C_{en}(s, a) = \begin{cases} g(\theta_{en}, s_{e,aan}) - \theta_{en}, & \text{if } s_{es} = \text{on} \\ 0, & \text{otherwise} \end{cases} \quad (20)$$

Formula (20) can be intuitively described as follows. When the ambient noise is already greater than the engine noise (i.e., $\theta_{en} \gg s_{e,aan}$), then $C_{en}$(s, a)$\approx$0 (dB). Conversely, for example, if the ambient noise is half the noise of the engine (i.e., $\theta_{en} \approx s_{e,aan}$), then $C_{en}$(s, a)$\approx$3 (dB). The notation used herein is clarified to avoid any ambiguities: Since a state s has an edge e as part of its definition, the state's edge is referred to as $s_e$; and a property of the state's edge is denoted as $S_{e,<property>}$ (e.g., $s_{e,aan}$, which denotes the property average ambient noise level of the edge).

For any goal state $s_g \in G$, the cost for all actions a is zero (i.e., $\vec{C}$(s, a)=0), therewith completing the requirement of a goal.

Figure 4:
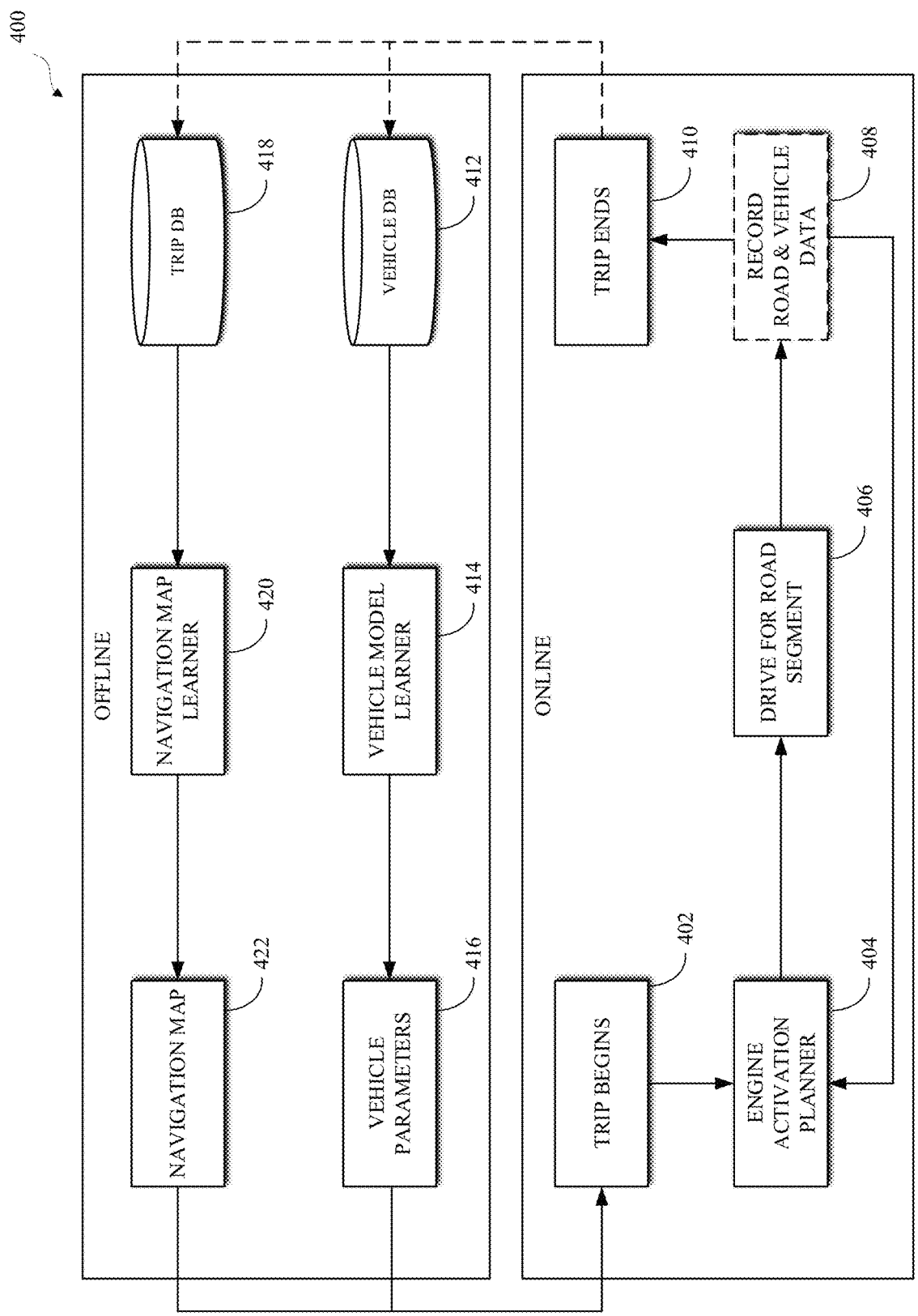
FIG. 4 illustrates a high level flow of engine activation planning according to implementations of this disclosure.

FIG. 4 illustrates a high level flow 400 of engine activation planning according to implementations of this disclosure. A HEV may start a trip at 402. As mentioned above, the destination may or may not be known.

An engine activation planner (i.e., planner) is initiated at 404 to select (e.g., plan, predict, etc.), for each next road segment, an engine activation action, based on a policy. The policy, which is described above, may be determined (e.g., computed, etc.) online or offline.

In the online case, the policy is computed dynamically and can reflect/incorporate changes occurring in real or near real time as the vehicle traverses edges of a navigation map, which is described above. In another example, the policy may be calculated offline and used online (i.e., during actual drives of the HEV). An offline computed-policy may be computed once whereas an online-computed policy can be continually recomputed as the HEV is being driven. As mentioned above, to compute the policy, vehicle parameters and the navigation map are required. In the online case, the vehicle parameters and the navigation map may be static.

For an upcoming road segment, the planner determines an activation action (e.g., whether the engine should be on or off) on that segment of the road. The planner, which may be executing in the HEV, determines the activation action as described above with respect to the MOSSP. The planner can start to perform its algorithm as soon as the HEV is turned on. The HEV considers the possibilities of where the HEV (e.g., the driver of the HEV) may be going in the case that a route is not already known.

At 406, after the vehicle drives for a road segment of a predetermined length, the planner may optionally record, at 408, data related to at least some vehicle parameters, such as those described with respect to Table I. The data related to the vehicle parameters may be changes to such vehicle parameters. For example, the planner may record changes in the Battery Capacity $\theta_{bc}$ based on the engine status. For example, the planner may record the generated Engine Noise $\theta_{en}$ using a noise sensor, such as an external microphone of the vehicle. The planner may also record road data related to the segment (e.g., edge) of the road that the HEV is currently traversing. The road data related to the segment can be or can include at least some of the parameters described with respect to Table III.

If the trip ends, then the flow 400 proceeds to 410; otherwise, the flow 400 returns to 404 to plan the next activation action. In an example, the flow 400 ends at 410. In another example, the recorded data at 410 (if any) may be transferred, such as to a central location (e.g., a cloud-based server). At the central location, the recorded vehicle parameters can be incorporated into a vehicle database 412 and the road data can be incorporated a trip database 418. The respective data in the vehicle database 412 and the trip database 418 can be aggregated (e.g., averaged, statistically analyzed, etc.) by a vehicle model learner 414 and a navigation map learner 420, respectively. To illustrate, and without limitations, the navigation map learner 420 may determine for a same road segment that is traversed multiple times the Average Battery Consumption/Regeneration $e_{abcr}$ on that segment; the navigation map learner 420 may determine points (vertices) at which edges of the navigation map should inserted, which may correspond, for example, to locations where the HEV stopped, such as at as a traffic light or a stop sign; the vehicle model learner may update the Battery Capacity $\theta_{bc}$; and so on.

The navigation map learner 420 updates the navigation map 422, which can be or can include parameters such as those described with respect to Table II and Table III. The vehicle model learner 414 updates the vehicle parameters 416. The updated navigation map 422 and/or the updated vehicle parameters 416, or portions thereof, can then be provided, at some point in time, to the HEV so that the updated information can used in a next trip.

It is to be noted that the navigation map 422 may include (e.g., incorporate) information received from many vehicles and many other trips on many other roads than those received from one vehicle trip and/or the updated vehicle parameters 416.

In an example, the vehicle model learner 414 and/or the navigation map learner 420 can be available (e.g., can execute in, etc.) the vehicle itself. In such a case, vehicle model learner 414 and/or the navigation map learner 420 only learn the patterns of one or more of the drivers of the HEV itself.

Figures 5A, 5B:
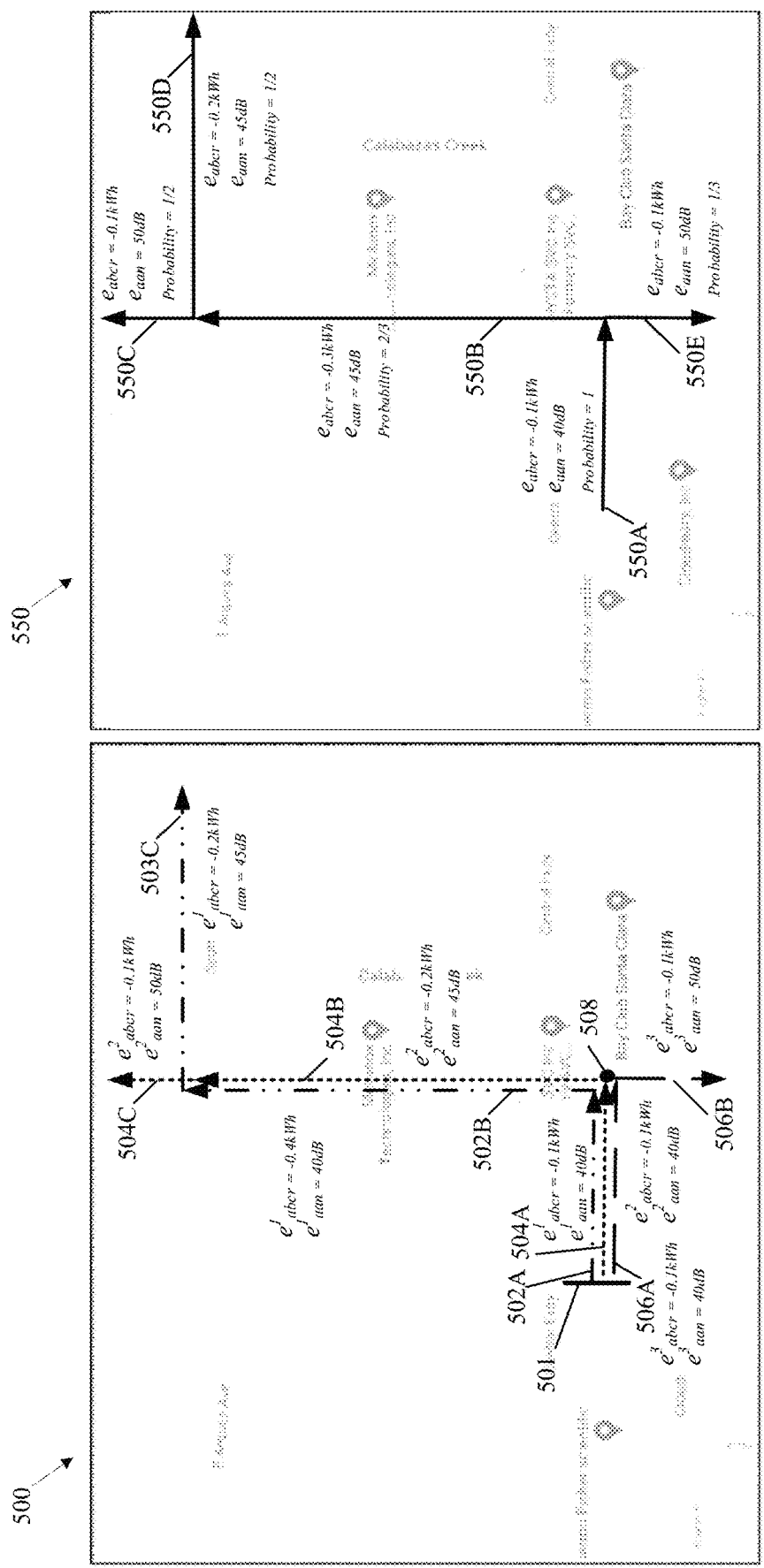
FIGS. 5A-5B illustrate examples of using a navigation map according to implementations of this disclosure.

FIGS. 5A-5B illustrates examples of using a navigation map according to implementations of this disclosure. The navigation map can be as described above.

FIG. 5A illustrates an example 500 of recorded navigation map data according to implementations of this disclosure. More specifically, the example 500 illustrate recorded data corresponding to two edge parameters, namely Average Ambient Noise $e_{aan}$ and Average Battery Consumption/Regeneration $e_{abcr}$. However, as mentioned above, edge parameters can include more, fewer, or other parameters. The recorded data can be captured by an engine activation planner, which can be the engine activation planner 404 of FIG. 4, which may be executing in/for a vehicle.

Starting at a same position 501, the vehicle took, at different points in time (such as on different days), three different routes: routes 502, 504, and 506. With respect to the route 502, the vehicle followed, in that order, road segments 502A, 502B, and 502C, which may be edges in the navigation map. With respect to the route 504, the vehicle followed, in that order, road segments 504A, 504B, and 504C, which may be edges in the navigation map. With respect to the route 506, the vehicle followed, in that order, road segments 506A, and 506B, which may be edges in the navigation map. The road segments 502A, 504A, and 506A are the same road segment; and the road segments 502B and 504B are the same road segment. For each of the road segments, the planner obtained (such as from sensors of the vehicle or via calculations) the Average Battery Consumption/Regeneration $e_{abcr}$ and Average Ambient Noise $e_{aan}$ as shown in Table IV.

TABLE IV

| Road Segment | $e_{abcr}$ | $e_{aan}$ |
|---|---|---|
| 502A | −0.1 kWh | 40 dB |
| 502B | −0.4 kWh | 40 dB |
| 502C | −0.2 kWh | 45 dB |
| 504A | −0.1 kWh | 40 dB |
| 504B | −0.2 kWh | 45 dB |
| 504C | 0.1 kWh | 50 dB |
| 506A | −0.1 kWh | 40 dB |
| 506B | −0.1 kWh | 50 dB |

The obtained edge parameter values are shown in FIG. 5A using the superscripts 1, 2, and 3 corresponding to the routes 502, 504, and 506, respectively. Negative values for the Average Battery Consumption/Regeneration $e_{abcr}$ indicate an overall energy expenditure. It is noted that the energy expenditure on the road segment 502B (i.e., $e_{abcr}^{1}=-0.4$ kWh) is higher than that of the road segment 504B (i.e., $e_{abcr}^{2}=-0.1$ kWh). This may be due, for example, to the fact that during the route 502, the vehicle was driving significantly faster on the road segment 502B than on the road segment 504B during the route 504; or this may be due to, for example, the driver slowing down because of traffic or braking (resulting in regenerative braking) on the road segment 504B.

FIG. 5B illustrates an example 550 of aggregating the parameters collected with respect to the example 500 of FIG. 5A. As mentioned above, the aggregation can be performed, depending on the parameters being aggregated, by at least one of the navigation map learner 420 or the vehicle model learner 414 of FIG. 4. With respect to the parameters described in example 500, the navigation map learner 420 of FIG. 4 can perform the aggregation.

The example 550 shows the five unique road segments (e.g., edges in the navigation map), namely road segments 550A-550E, and the corresponding aggregated (e.g., averaged) values. Instead of Average Traversal Time, as shown in Table III, and as mentioned above, the navigation map learner determines (e.g., calculates) a probability of traversal of the edge. To illustrate, at a junction point 508 of the example 500, out of the tree total trips (corresponding to the routes 502-506), the vehicle twice turned left (corresponding to the road segments 502B and 504B) and once turned right (corresponding to the road segment 506B). Thus, the probability of traversal of the road segment 550E is 1/3.

Figure 6A:
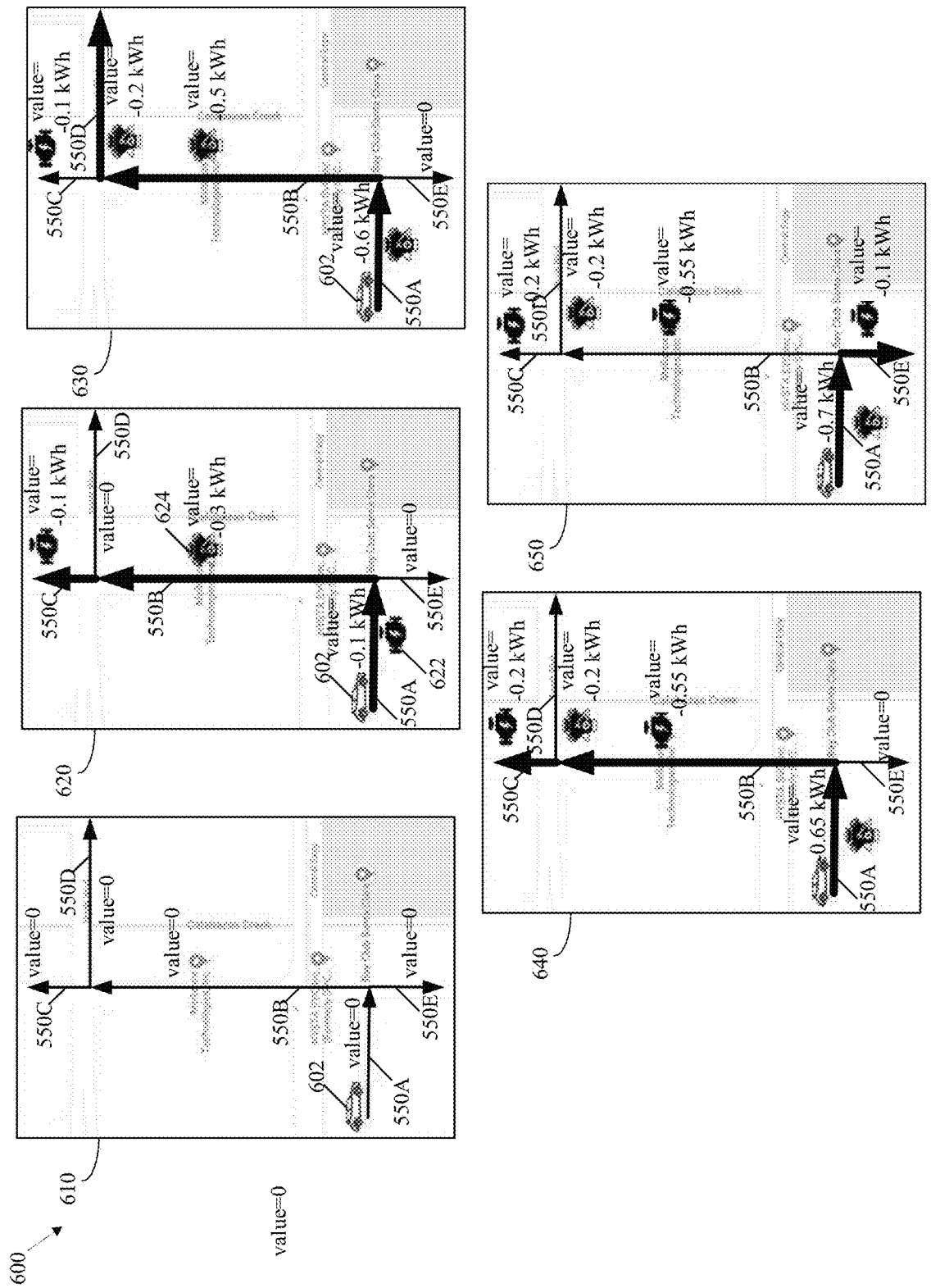
FIGS. 6A-6B illustrate an example of operations of an engine activation planner according to implementations of this disclosure.
Figure 6B:
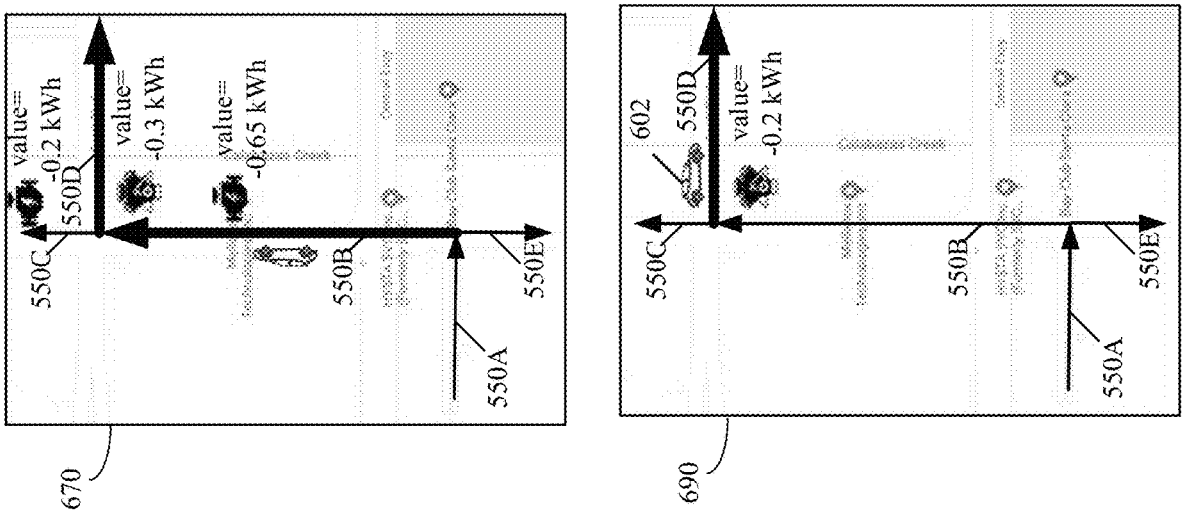
Figure 6B:
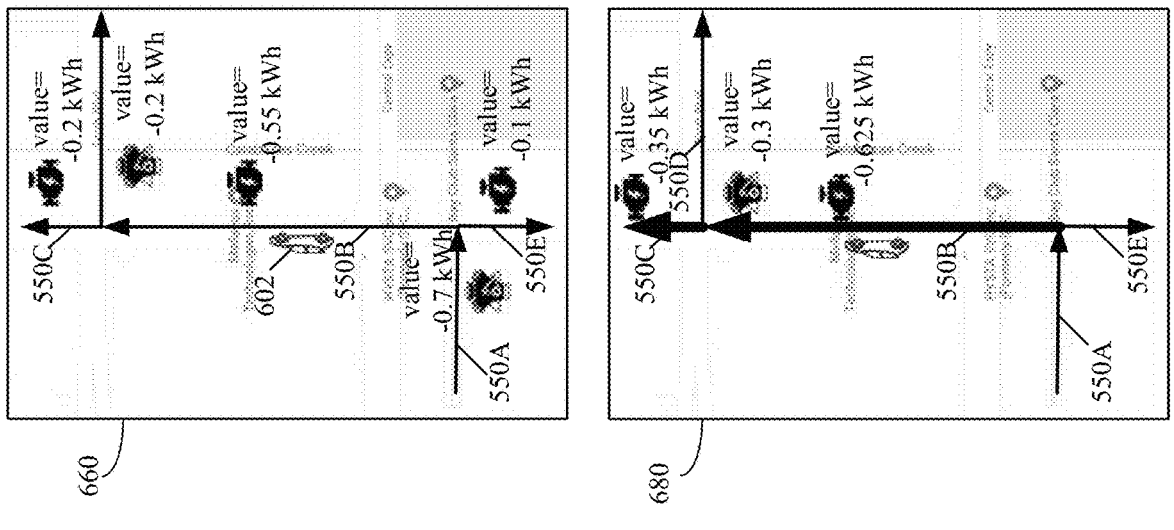

FIGS. 6A-6B illustrate an example 600 of operations of an engine activation planner according to implementations of this disclosure. The example 600 illustrates that a vehicle 602 is traversing some of the road segments 550A-550E on a fourth trip (the first through the third trips being those described with respect to FIG. 5A) where the destination is unknown. That is, the route to be taken by the vehicle 602 is not known. The operations of the example can be performed by the engine activation planner 404 of FIG. 4, such when a vehicle 602 is turned on.

An initial scene 610 illustrates an initial state where a value (e.g., single value $V_f(s)$, as described above) of zero is associated with each of the road segments 550A-550E. The engine activation planner then solves the MOSSP (such as using the FLARES algorithm) to obtain a policy, using the navigation map and the vehicle parameters, to assign respective values to states. As mentioned above, the values can be the result of scalarization of different costs or objectives. In the example 600, without limitations and for simplicity of the explanation, only one value is considered; namely, the total energy expenditure (in kWh).

The planner can consider possible routes. The planner samples the routes and may revisit the same sampled routes. Because this is probabilistic (e.g., the route is unknown), the planner may perform a Monte Carlo sampling including resampling the same trajectories. The probability of the sample can be based on the previous traversal probabilities from the navigation map.

As the planner samples, the planner can accumulate costs for the considered objectives. Again, in the example 600, only total energy expenditure is considered. After each sample route, the planner remembers (e.g., retains, etc.) the expected values (e.g., the expected values for the rest of time from that road segment for the rest of the route). Based on the expected value for turning the engine on or off, the planner decides which is the better activation action for that road segment.

In a scene 620, the planner calculates values associated with the vehicle 602 following the route 550A-550B-550C. A value of −0.1 kWh may be associated with (e.g., calculated for, etc.) an engine activation action of "off" (as indicated by an icon 622) for the road segment 550A (which partially described a first state); a value of −0.3 kWh may be associated with an engine activation action of "on" (as indicated by an icon 624) for the road segment 550B (which partially describes a second state); and a value of −0.1 kWh may be associated with the engine activation action of "off" for the road segment 550C (which partially describes a third state).

In an scene 630, the planner calculates values associated with the vehicle following the route 550A-550B-550D. A value of −0.6 kWh may be associated with an engine activation action of "on" for the road segment 550A; a value of −0.5 kWh may be associated with an engine activation action of "on"; and a value of −0.2 kWh may be associated with the engine activation action of "on" for the road segment 550D.

In a scene 640, the planner calculates values associated with the vehicle following the route 550A-550B-550C again. A value of −0.65 kWh may be associated with an engine activation action of "on" for the road segment 550A; a value of −0.55 kWh may be associated with an engine activation action of "off" for the road segment 550B; and a value of −0.2 kWh may be associated with the engine activation action of "off" for the road segment 550C.

In a scene 650, the planner calculates values associated with the vehicle following the route 550A-550E. A value of −0.7 kWh may be associated with an engine activation action of "on" for the road segment 550A; and a value of −0.1 kWh may be associated with an engine activation action of "off" for the road segment 550E.

The result of the sampling is a final decision as to which activation action to select. The decision is considered final after all the possible samples have been considered, after a predetermined maximum number of samples have been considered, after a time for considering more samples has run out, or some other conditions, whichever comes first. In an example, the time to consider other samples may run out when, for example, the vehicle starts moving (e.g., the driver starts driving, such after a traffic light turns green) or the vehicle takes a next road segment.

As such, the engine can be turned on the road segment 550A. A scene 660 shows that the vehicle 602 has turned onto the road segment 550B. The planner remembers the values already calculated for the roads that matter (e.g., the road segments 550B, 550C, and 50D) and continues to sample again. That is, as the vehicle is driving, the planner continues to sample the possible routes, averages the different routes, and decides on activation actions (e.g., engine on or engine off). Thus, in the scene 670, the planner samples the route 550B-550D and calculates the respective values and activation actions as shown; and in the scene 680, the planner samples the route 550B-550C and calculates the respective values and activation actions as shown. In this case, the planner selects the activation action "off" on the route segment 550B. In a scene 690, the vehicle 602 has now turned onto the road segment 550D. The planner determines that the engine is to be turned on the road segment 550D.

Figure 7:
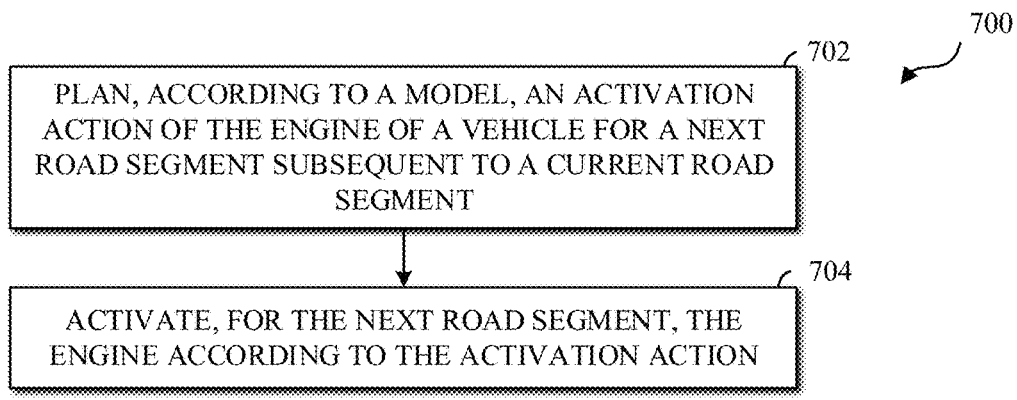
FIG. 7 is a flowchart diagram of an example of a technique for engine activation in accordance with an embodiment of this disclosure.

FIG. 7 is a flowchart diagram of an example of a technique 700 for engine activation in accordance with an embodiment of this disclosure. The technique 700 can be implemented, partially or fully, by a HEV, such as a hybrid vehicle as those described with respect to FIG. 3. The technique 700 can be implemented in an AV that is a hybrid electric vehicle, which can be the vehicle 100 shown in FIG. 1, one of the vehicles 210/211 shown in FIG. 2, a semi-autonomous vehicle, or any other vehicle that may include drive-assist capabilities. The technique 700 can be implemented as instructions that are stored in a memory, such as the memory 134 of FIG. 1. The instructions can be executed by a processor, such as the processor 133 of FIG. 1.

At 702, the technique 700 plans, according to a model, an activation action of an engine of a vehicle for a next road segment subsequent to a current road segment that the vehicle is traveling on, as described above. The model includes a state space that includes a navigation map. The navigation map includes the current road segment of the vehicle, a current charge level of the battery, and whether the engine is currently on or off. The activation action includes a first action to turn on the engine to charge the battery and a second action to turn off the engine. As described above, an engine activation planner can solve the model to obtain a policy, which is then used to obtain the activation action.

Planning, according to the model, the activation action of the engine can include solving the model using an optimization technique to obtain a policy. In an example, the optimization technique is a multi-objective Markov decision (MOMDP) process, as described above. As described above, the MOMDP can use a cost function that includes at least one cost. The at least one cost can be a total energy, a wasted energy, a battery regenerated power, a battery consumed power, a fuel consumed amount, whether the engine toggled, whether the engine auto-toggled from off to on or from on to off, a time to traverse the edge, or an extra noise level.

In an example, the MOMDP can be solved using constrained optimization on the at least one cost, as described above. In an example, the MOMDP can be solved using a scalarizing function of the at least one cost, as described above. In an example, the optimization technique can be one of a partially observable Markov decision process (POMDP) or a classical planning (CP) process.

In an example, planning, according to the model, the activation action can include planning the activation action according to an objective. The objective can be at least one of minimizing energy consumption of the vehicle, minimizing noise related to activation of the engine, or minimizing a number of times that the engine is toggled, as described above.

In an example, the state space can also include whether a power-consuming component of the vehicle is on or off, as described above. The model can also include a transition function that includes at least one of a movement in edges of the navigation map, a battery change function, and a change in engine status based on the navigation map and a performed activation action, as described above.

At 704, the engine is activated, for the next road segment, according to the activation action. As described above, in an example, the engine activation planner can activate the engine. In an example, the engine activation planner can transmit the activation action to an engine control module, which in turn activates the engine. Activating the engine includes turning on or turning off the engine according to the activation action.

Figure 8:
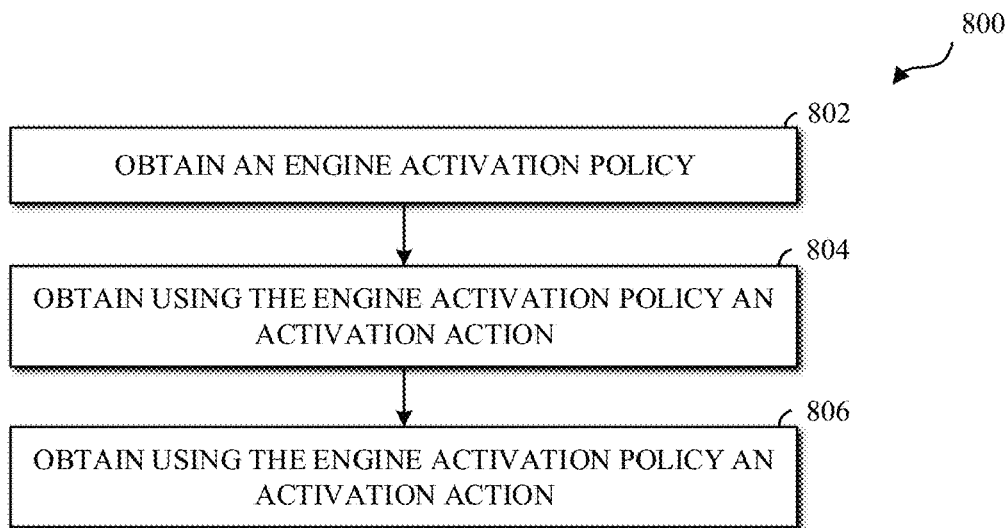
FIG. 8 is a flowchart diagram of an example of a technique for charging a battery of a vehicle by an engine in accordance with an embodiment of this disclosure.

FIG. 8 is a flowchart diagram of an example of a technique 800 for charging a battery of a vehicle by an engine in accordance with an embodiment of this disclosure. The technique 800 can be implemented, partially or fully, by a HEV, such as a hybrid vehicle as those described with respect to FIG. 3. The technique 800 can be implemented in an AV that is a hybrid electric vehicle, which can be the vehicle 100 shown in FIG. 1, one of the vehicles 210/211 shown in FIG. 2, a semi-autonomous vehicle, or any other vehicle that may include drive-assist capabilities. The technique 800 can be implemented as instructions that are stored in a memory, such as the memory 134 of FIG. 1. The instructions can be executed by a processor, such as the processor 133 of FIG. 1.

At 802, the technique 800 obtains an engine activation policy by modeling engine activation as a Markov decision process (MDP), as described above. The MDP can include a state space, an action space, and a state transition function.

In an example, the state transition function includes a first component indicating how a location of the vehicle changes stochastically following a topological graph of the edges formed by various road segments connecting start nodes to end nodes of a navigation map, as described above. The navigation map can include nodes and edges, where each edge is connected by a start node and an end node of the nodes, as described above. In an example, the state transition function can also include a second component indicating a predefined engine activation based on a range of a state of charge of the battery, as described above. In an example, the state transition function can also include a third component indicating at least one of how a battery level of the battery changes given energy consumption or regeneration information of an edge of the navigation map, an average traversal time of the edge, an engine activation action, a power at which the battery is charged from the battery, a number of times of stopping while traversing the edge, a number of times of traversing the edge, or an average battery power regeneration on a stop. In an example, the battery level can be discretized, as described above.

At 804, the technique 800 obtains, using the engine activation policy, an activation action from the action space, as described above. The action space can include a first activation action of turning the engine on and a second activation action of turning the engine off.

At 806, the technique 800 activates an engine according to the activation action. As described above, activating the engine using the first activation action causes the engine to turn on to charge a batter of the vehicle.

Figure 9:
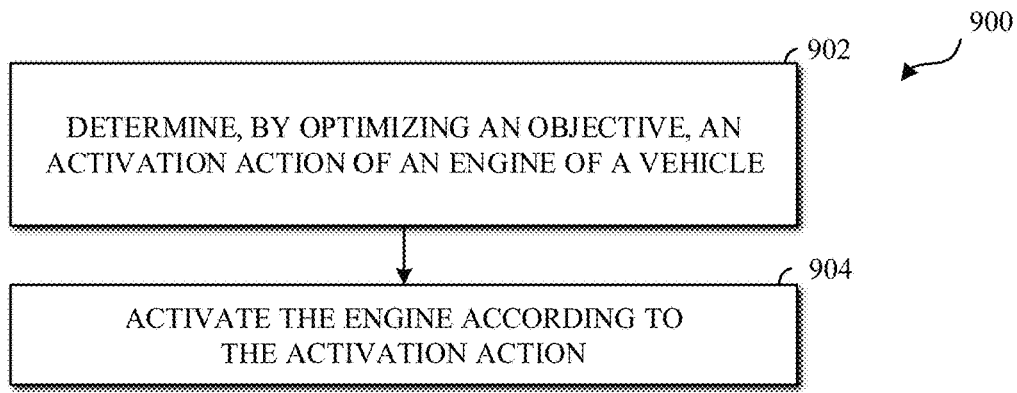
FIG. 9 is a flowchart diagram of an example of a technique for charging a battery of a vehicle by an engine in accordance with an embodiment of this disclosure.

FIG. 9 is a flowchart diagram of an example of a technique 900 for charging a battery of a vehicle by an engine in accordance with an embodiment of this disclosure. The technique 900 can be implemented, partially or fully, by a HEV, such as a hybrid vehicle as those described with respect to FIG. 3. The technique 900 can be implemented in an AV that is a hybrid electric vehicle, which can be the vehicle 100 shown in FIG. 1, one of the vehicles 210/211 shown in FIG. 2, a semi-autonomous vehicle, or any other vehicle that may include drive-assist capabilities. The technique 900 can be implemented as instructions that are stored in a memory, such as the memory 134 of FIG. 1. The instructions can be executed by a processor, such as the processor 133 of FIG. 1.

At 902, the technique 900 determines (e.g., calculates, predicts, etc.), by optimizing an objective, an activation action of an engine of a vehicle. The activation action can be selected from a set including a first activation action of turning the engine on and a second activation action of turning the engine off. As described above, the battery of the vehicle is charged by the engine when the engine is turned on.

In an example, the objective can be based on at least two of an energy expenditure of the engine, a wasted energy, and an extra noise generated by the engine. In an example, the objective can be to minimize, over time, a total energy consumption of the engine. In an example, costs associated with a next activation action of the engine can be used in optimizing the objective. The costs can include at least one of an expected energy expenditure cost, an expected wasted energy cost, an expected cost of the engine switching, or an extra noise generated if the engine is activated.

At 904, the technique 900 activates the engine according to the activation action.

As mentioned above, routes can be planned while taking into consideration engine activation. For example, a route that is a quietest route from amongst possible routes can be planned. "Quietest," in this context, relates to the noise generated as a result of the engine turning on and the engine running as it is charging the battery. The quietest route can be planned while taking into account the ambient noise on the road segments (as may be available in a navigation map) and/or noise internal to the vehicle (such as when the radio and/or heating/air-conditioning unit are on). A route can be planned, for example, such that the engine is turned on in noisy areas because ambient noise can mask the engine noise. In another example, a route can be planned so as to minimize total energy expenditure. For example, a route that may require a lot of braking can be selected.

In an example, the driver can be prompted for a route preference. To illustrate, the driver may be prompted to select, from among identified routes or route objectives, "would you prefer a route to save fuel?" or "would you prefer a route to save on noise?" Depending on the driver's selection, different weights can be assigned to the costs or different objectives can be set for the route planner.

As compared to a traditional route planner, which can deterministically calculate a route, planning a route that accounts for engine activation is stochastic because it cannot be pre-determined how the battery charge will change over time. A stochastic model of the change may be available, but the concrete specifics are not.

In an example, a navigation system (also can also be referred to as, or can include, a routing application, a route planner, or the like) can plan routes based on the hard-coded rules described above. In another example, a route planner can be integrated into (e.g., be a part of) an engine activation planner, which can be as described above. To be clear, route planning and engine activation planning can be orthogonal. One or both of the route planning and engine activation planning can be used in a HEV.

Route planning using an engine activation planner can be modeled as an MOSSP problem, $\langle S, A, T, C, s_o, g_0 \rangle$ which is a type of Markov decision process. Other models, such as a partially observable MPD (POMDP), can be used to plan the route. The MOSSP is a multi-objective route planner that can either be to minimize one objective, combine objectives with a scalarization function, or use a preference ordering in the form of a directed acyclic graph (DAG) E with slack constraints $\delta(e)$. An example of preference ordering is illustrated with respect to FIG. 11.

The state space can be as described above. As such, the state space can include the current battery level. Optionally, $s_0$ and $s_g$ are the start and the goal states, respectively. The goal state can be optional when a destination is not specified, such as by the driver.

The action space A is defined as $A(s) \subseteq S_e \times \{on, off\}$, which selects for a state s one of the successor roads in $S_e$ and an activation action (e.g., to turn the engine on or to turn the engine off).

The transition function T(s, a, s') can enforce the navigation map but allows for the driver to select which successor lane to traverse. This includes the probability that the driver can successfully make lane changes, the probabilistic density of traffic, etc. That is, the transition function T (s, a, s') needs to ensure that the vehicle can actually physically move from state s to an immediate next state s'. For example, if the vehicle on a first segment that is not connected to a second segment, then the probability of transitioning to the second segment from the first segment would be zero. The transition function can use knowledge (i.e., information in the navigation map) of traffic and how much battery might be consumed/regenerated on different road segments (such as hills, stops, etc.). Since the battery level and the engine changing are factors of the state, the transition function can also incorporate a multiplication of the probability of battery level and the engine changing. At least the current battery level and the transition function can be used to compute an expected value for any possible route from start to goal, which is what an SSP MDP, POMDP, MOSPP, etc. does.

The cost function C(s, a) can include one or more of the costs described above. That is the cost function can include one or more of total energy (kWh), wasted energy (kWh), battery regenerated (kWh), battery consumed (kWh), fuel consumed (L), engine toggled, engine auto toggled, time to traverse the edge, and extra noise. Other costs are possible.

In an example, the primary objective can be the minimize the time (route time). In an example, the primary objective can be to minimize the time with either a respective preference/weight for at least one of total energy (kWh) and/or extra noise. As mentioned above, a scalarization function $f(C(s, a)) = C_f(s, a)$ can be used. To illustrate, and without loss of generality, a scalarization function of the time (t), the battery level (b), and the generated noise (n) may be $f(t, b, n) = 2*t + 5*b + n$.

Figure 11:
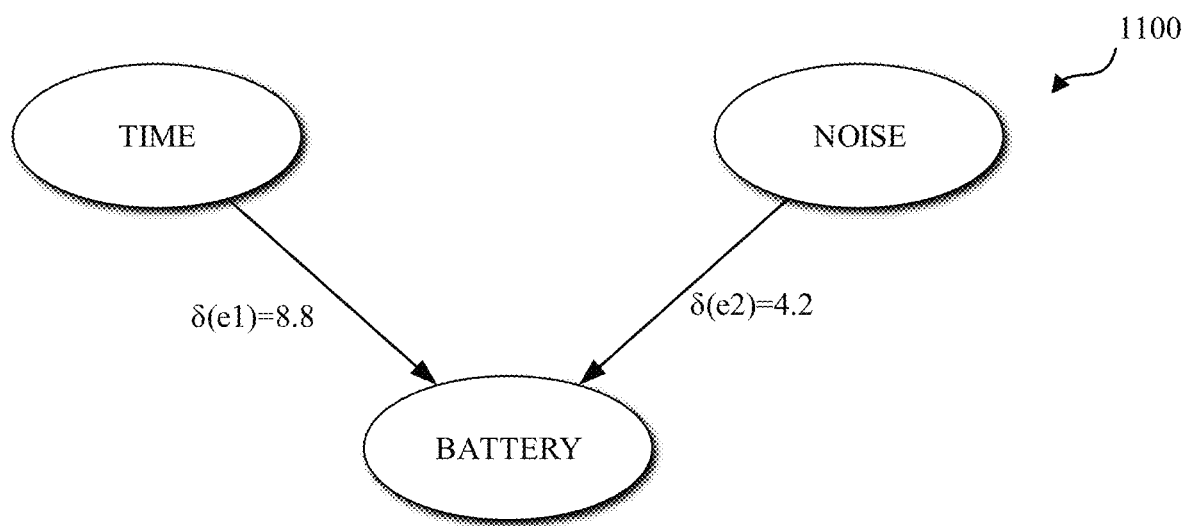
FIG. 11 is a diagram of an example of a preference ordering graph according to implementations of this disclosure.

In another example, a preference ordering graph E with slacks $\delta(e) \geq 0$ can be used. FIG. 11 is a diagram of an example 1100 of a preference ordering graph according to implementations of this disclosure. The example 1100 illustrates solving an SSP MDP route for minimizing battery usage that is constrained to policies that satisfy: $V^*_t(b_0) - V_t(b_0) \leq \delta(e1)$ and $V^*_n(b_0) - V_n(b_0) \leq \delta(e2)$, wherein $V^*_t(b_0)$ is the optimal value obtained for battery usage and where $b_0$ is a current battery level. In other words, the final route that minimizes battery usage must be within the slack budget of both time and noise.

In another example, an SSP MDP route for minimizing the time objective can be solved resulting in an optimal value $V^*_t(b_0)$. In another example, an SSP MDP route for minimizing the noise objective can be solved resulting in an optimal value $V^*_n(b_0)$.

Figure 10:
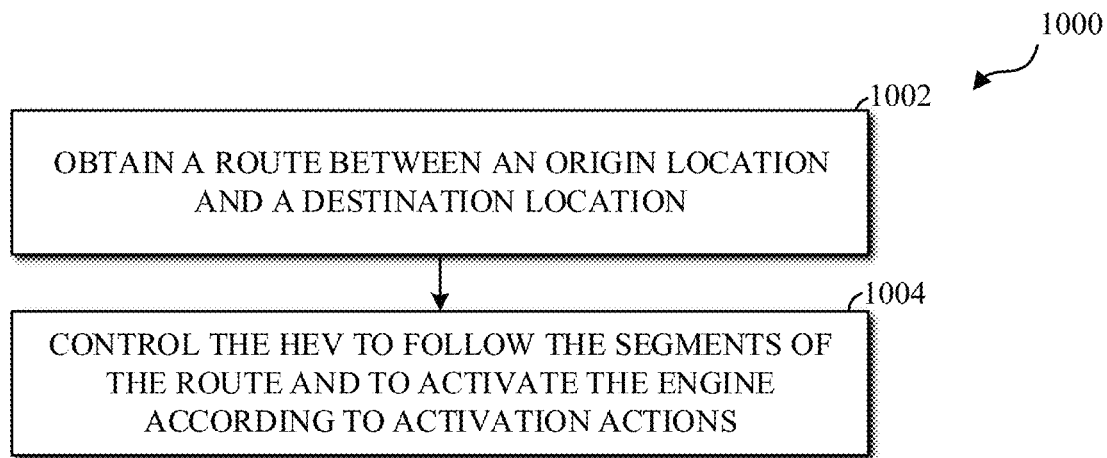
FIG. 10 is a flowchart diagram of an example of a technique for route planning for a hybrid electric vehicle according to an implementation of this disclosure.

FIG. 10 is a flowchart diagram of an example of a technique 1000 for route planning for a hybrid electric vehicle (HEV) according to an implementation of this disclosure. The technique 1000 can be implemented, partially or fully, by a HEV, such as a hybrid vehicle as those described with respect to FIG. 3. The technique 1000 can be implemented in an AV that is a hybrid electric vehicle, which can be the vehicle 100 shown in FIG. 1, one of the vehicles 210/211 shown in FIG. 2, a semi-autonomous vehicle, or any other vehicle that may include drive-assist capabilities and is an HEV. The technique 1000 can be implemented as instructions that are stored in a memory, such as the memory 134 of FIG. 1. The instructions can be executed by a processor, such as the processor 133 of FIG. 1.

At 1002, the technique 1000 obtains a route. In an example, the route can be obtained between an origin location and a destination location. In an example, the origin location can be a current location of the vehicle. The destination location may not be known and the technique may probabilistically determine one or more next road segments for the HEV.

The route can be optimized for at least one of a noise level or energy consumption of an engine of the HEV that is used to charge a battery of the HEV. The route includes respective engine activation actions for at least some segments of the route. Obtaining the route can mean determining (e.g., selecting, predicting, choosing, etc.) a next route segment and an associated engine activation action, as described above with respect to the action space A of the route planner.

In an example, the route can be obtained using engine activation rules that maintain homeostasis within a range, as described above with respect to the hard-coded rules. In an example, the route can be obtained using a Markov decision process, such as a MOSSP, as described above. The MOSSP can select a next road segment and an engine activation action for the next road segment given a current state. The MOSPP can include a state space that includes a navigation map. The navigation map can include the current road segment of the vehicle, a current charge level of the battery, and whether the engine is currently on or off.

In an example, the destination may be known with certainty, such as when the driver sets the destination. However, in another example, the destination is determined stochastically such as using a navigation map, as described above.

In an example, in anticipation of upcoming road segments resulting in regenerative energy that charges the battery, the technique 1000 does not turn on the engine so that the regenerative energy is not wasted. To illustrate, if the planner determines that the HEV will decelerate for an intersection (which means that a fair amount of energy can be expected to be recaptured and used to charge the battery), then the planner can plan for that by ensuring that, prior to the deceleration, the battery has sufficient capacity to absorb that energy and no energy is wasted.

At 1004, the HEV can be controlled to follow the segments of the route and to activate the engine according to the activation actions.

If the driver specifies the route (e.g., the destination), then the route planner can plan with certainty and can make informed guesses as to what the driver wants to do. If the driver deviates from the route, then the planned route (e.g., some activation actions) may end up being less than optimal. For example, the engine may be turned on in anticipation of the driver going straight on a highway when in fact the driver decelerates to take an exit.

In an example, route planning can be integrated with/into an Advanced Driver-Assistance System (ADAS). An ADAS can realize automated control of the vehicle speed. For example, under an advanced cruise control setting of the ADAS, the vehicle automatically slows down in advance of approaching curves and also automatically slows down in advance of merging onto a freeway or taking a freeway exit. For ADAS to realize such speed control, a destination must be known to the ADAS.

However, using a route planner as described herein with ADAS removes, at least to an extent, the requirement that a destination must be known because the route can be probabilistically determined using the navigation map. For example, the route planner may turn the engine off in anticipation of the vehicle taking a next highway exit. However, in some situations, the guess may be wrong and the driver may continue on the highway without taking the exit. Thus, in some situations, the guess of the route planner may be displayed to the driver on a display of the vehicle ahead of the exit so that the driver has the opportunity to express his/her disagreement with the proposed route. For example, by turning the turn signal lever in the opposite direction of the proposed route, the driver can express disagreement with the proposed route (e.g., next route segment).

As such, an aspect of this disclosed implementation includes a technique for driver assistance in a HEV that includes, when a driver assistance feature of the HEV is enabled and a destination of the HEV is not known, determining, using a policy of a Markov decision process (e.g., a MOSSP) a next road segment for the HEV and an engine activation action; and, in response to the next road segment being followed by the HEV, activating the engine according to the engine activation action, wherein the engine activation action is selected from a set comprising a first activation action of turning the engine on and a second activation action of turning the engine off, and the first activation action causes the engine to turn on to charge the battery of the HEV.

As eluded to above, simple, hard-coded rules are typically used for engine activation in hybrid vehicles. Engine activation with such rules is entirely based on a generic engineered scenario used by all vehicles (e.g., drivers).

However, engine activation can be significantly improved if the driving patterns of a driver can be learned and used in determining engine activation actions. As mentioned above, a navigation map can be used in determining engine activation actions and that, in some examples, the navigation map can be learned. The navigation map can include information about road conditions, which are basic information that the engine activation planner can use to infer the energy use in any one particular section of a drive. The usage policy calculated can depend on road conditions, on the particular vehicle (e.g., the mass the vehicle for example, the cross section of the vehicle, etc.), and also on the driving style of the driver. For example, a first driver who floors the gas pedal all the time will use more electric energy of the battery than a second driver who accelerates very gently. Thus, the first driver and the second driver would have different energy consumption profiles.

Thus, a learned map is one that can leverage/incorporate the history of driving behavior of drivers therewith enabling proactive planning of engine activation. To illustrate, and without loss of generality, the driving behavior of a driver can include the speed on an edge of the navigation map, preferred routes of driver, and so on.

The learned navigation map can enable customized engine activation planning based on a particular driver and/or a specific vehicle. For example, the engine activation planner can anticipate, based on the learned navigation map, a learned slowness of the particular driver. Similarly, the engine activation planner can anticipate the learned common routes the driver takes. Additionally, a learned navigation map can result in reduced engine consumption as contrasted with an obtained, non-customized (e.g., not learned or does not incorporate learning) navigation map.

A HEV may have multiple drivers. In order to learn a behavior for a particular driver, the engine activation planner can identify the driver using a mobile device of the driver, a key fob, or the like device that is assigned to the user and can be in communication with the HEV to identify the driver. In another example, when the vehicle is turned on, the driver can be prompted to identify him/herself, such as by selecting a profile that identifies the user to the HEV. Other ways of identifying the driver are possible.

As described above, as a human driver drives a HEV vehicle, a processor of the HEV can produce (e.g., generate, record, etc.) a list of GPS coordinates x with $x_i \in \mathbb{R}^r$, referred to herein as a GPS trace. Each GPS trace contains r data points, namely the normal GPS latitude, longitude, and altitude coordinates, as described above with respect to Table II. As described above with respect to Table III, a GPS trace can also include trace metadata relating to hybrid-related aspects of the vehicle at each recorded GPS coordinate. The metadata can include battery charge, ambient noise, road slope, vehicle speed, vehicle acceleration, gas pedal status, brake pedal status, fewer, more, other metadata, or a combination thereof.

As the driver goes about daily driving, there can be k GPS traces in a GPS trace collection: $x^1, \ldots, x^k$ traces. The traces can have different sizes (i.e., can include different numbers of GPS coordinates). These traces can be overlaid on top of one another, as described with respect to FIG. 5B, to create a driver-customized navigation map. Break points (e.g., nodes of the navigation map) can be established based on a threshold distance between two consecutive nodes. In an example, the threshold can be 0.1 km, however other threshold distances are possible. In an example, break points can be added when there is sufficiently distinct GPS coordinates away from a threshold meters from other GPS coordinates. As described above with respect to FIG. 5B, the trace metadata can also be learned by averaging. For a current road $s^r$, the next road chosen by the driver can be learned as: $Pr(s^{r'}|s^r) = {}_n(s^r, s^{r'})/\Sigma_{s} r'', n(s^r, s^{r''})$.

Several techniques can be available for obtaining breakpoints from a GPS trace, which may be a highly detailed GPS trace). In an example, the GPS trace can be broken at fixed intervals of distance (e.g., 0.1 km). In an example, the GPS trace can be broken by time (e.g., every 30 seconds). When multiple of these broken apart approximated navigation map traces are combined, the situation that the driver may have taken different routes that are not currently mapped or are not part of the navigation map, need be considered (e.g., accounted for). As such, in an example, to ensure that the driver is really driving on a new currently unmapped road (e.g., edge), a fixed interval of distance (or time) are considered. If the distance of a new point is far enough away from the current map (e.g., any vertex or edge of the navigation map), then a new road to be mapped can be added.

As described above, the learned navigation map can be used by an engine activation planner.

In an example of using the learned navigation map for engine activation, a rule-based algorithm can be used. The rule-based algorithm can look ahead a predefined distance (e.g., 1 km, or some other distance) for the most likely roads (e.g., edges) that the driver is likely to take given a current edge that the HEV is currently on and adjust the engine activation accordingly.

In another example, the learned navigation map can be used by a multi-objective stochastic shortest path (MOSSP) MDP that is defined by the tuple $\langle S, A, T, C, s_o, G \rangle$. The state space can be $=S_e \times S_b \times S_{es}$, where $S_e$ can be the (learned) navigation map (e.g., roads/lanes/edges) as described above. In an example, the transitions T(s, a, s') can directly equal and/or use the learned navigation map of the driver route behaviors: $T(s, a, s')=Pr(s^{e'}|s^e)*Pr(s^{b'}|s^b, a^b)$, which includes learned lane-level battery consumption/regeneration as well.

Figure 12:
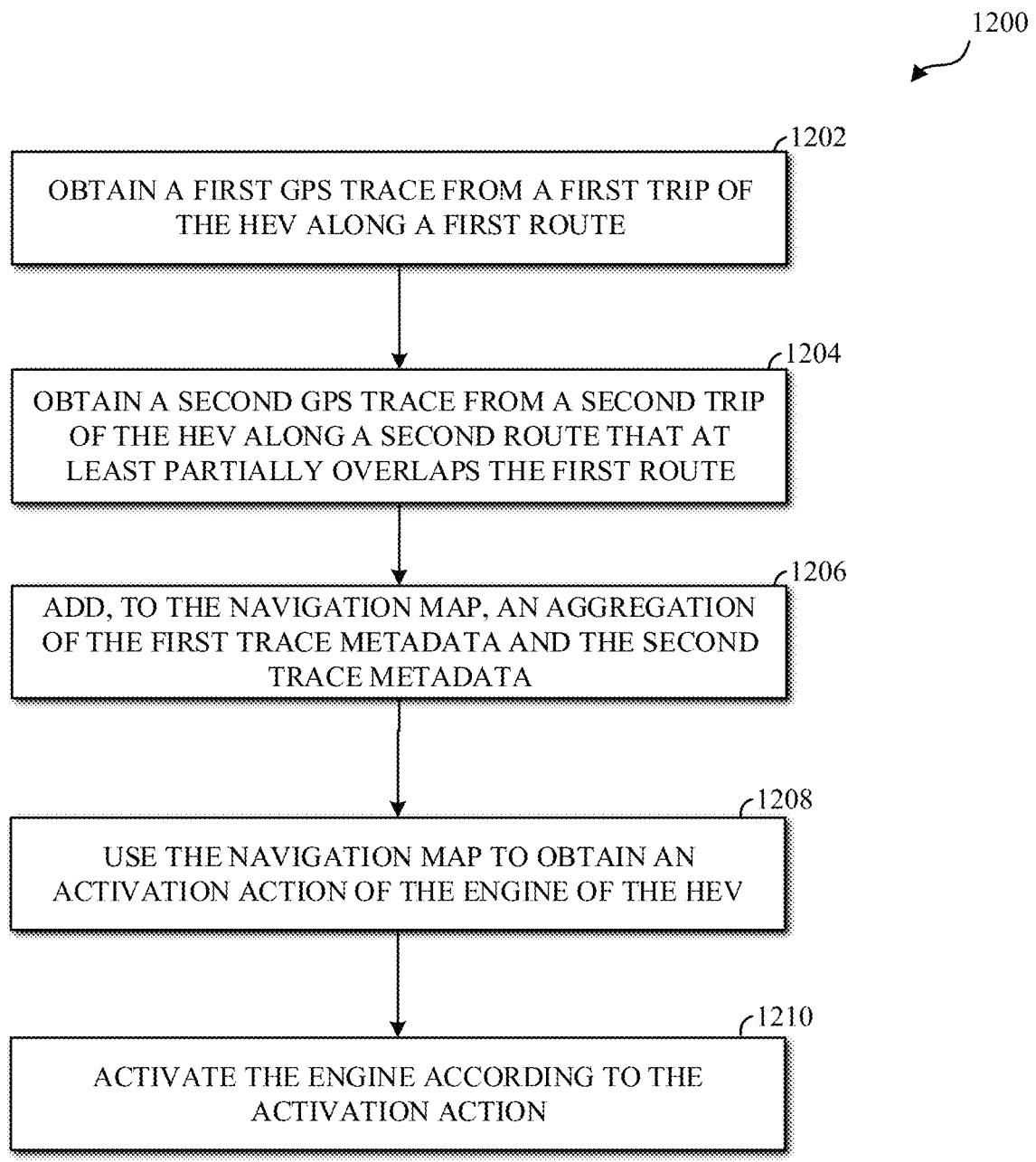
FIG. 12 is a flowchart diagram of an example of a technique for activating an engine of a hybrid electric vehicle using a learned navigation map in accordance with an embodiment of this disclosure.

FIG. 12 is a flowchart diagram of an example of a technique 1200 for activating an engine of a hybrid electric vehicle to charge a battery of the vehicle using a learned navigation map in accordance with an embodiment of this disclosure. The technique 1200 can be implemented, partially or fully, by a HEV, such as a hybrid vehicle as those described with respect to FIG. 3. The technique 1200 can be implemented in an AV that is a hybrid electric vehicle, which can be the vehicle 100 shown in FIG. 1, one of the vehicles 210/211 shown in FIG. 2, a semi-autonomous vehicle, or any other vehicle that may include drive-assist capabilities. The technique 1200 can be implemented as instructions that are stored in a memory, such as the memory 134 of FIG. 1. The instructions can be executed by a processor, such as the processor 133 of FIG. 1.

At 1202, the technique 1200 obtains a first global positioning system (GPS) trace from a first trip of the HEV along a first route. The first GPS trace comprises first coordinates and first trace metadata, as described above. At 1204, the technique 1200 obtains a second GPS trace from a second trip of the HEV along a second route that at least partially overlaps the first route, as described above, such as with respect to FIG. 5A. The second GPS trace comprises second coordinates and second trace metadata.

At 1206, the technique 1200 adds, to the navigation map, an aggregation of the first trace metadata and the second trace metadata for edges of the navigation map, as described above. That is, the technique 1200 can update the navigation map to incorporate the first trace metadata and the second trace metadata.

At 1208, the technique 1200 uses the navigation map to obtain an activation action of the engine of the HEV. The activation action can be selected from a set comprising a first activation action of turning the engine on and a second activation action of turning the engine off. Using the navigation map to obtain the activation action of the engine of the HEV can include identifying, for a current position of the HEV along an edge of the navigation map, a set of most likely roads of the HEV; and selecting the activation action based on the set of most likely roads. The set of most likely roads can be identified by looking ahead, using edge traversal probabilities of the navigation map, a predetermined distance.

Using the navigation map to obtain the activation action of the engine of the HEV can include obtaining the activation action using a Markov decision process (MDP) where a state space of the MDP includes the navigation map.

At 1210, the technique 1200 activates the engine according to the activation action. Activating the engine using the first activation action causes the engine to turn on to charge the battery of the HEV.

The first trace metadata and the second trace metadata can each include respective metadata relating to at least one of a battery charge of the HEV, ambient noise, slope, speed of HEV, acceleration of the HEV, gas pedal status, or brake pedal status, as described above. In an example, the aggregation of the first trace metadata and the second trace metadata for each of the edges includes a probability of traversal of a first edge following a second edge, as described above.

The technique 1200 can also include selecting nodes to create the edges of the navigation map. The nodes can be selected (e.g., set, etc.) at a predefined threshold distance from each other. The technique 1200 can include determining, using an objective, a route for the HEV using the navigation map. The objective can be related to at least one of an energy expenditure or a noise level.

Using the navigation map to obtain an activation action of an engine of the HEV can include calculating a policy using a Markov decision process (MDP) that uses a state space that includes the navigation map. The policy can be for a particular driver of the HEV. The policy can be for multiple drivers of the HEV (i.e., learned for the HEV itself). The policy can be used in route planning. The policy can be used for engine activation.

Multiple connected vehicles (such as connected to a cloud-based sever) can combine their learned information into a shared navigation map, as described with respect to FIG. 4. Thus, in an aspect, the server (or, equivalently, operations (e.g., executable instructions, etc.) therein) can receive from HEVs (e.g., from multiple vehicle platforms) respective GPS traces that include respective coordinates and trace metadata.

Over time, the server receives information about many roads that many drivers have driven in an area and not just for a road that a specific HEV has driven. The GPS traces can also include identifying information of the vehicle platforms (e.g., Nissan LEAF, Nissan Sentra, Nissan Rogue, etc.) and/or the particular drivers for which the GPS trace was generated. Using the received GPS traces, the server can then separate that information into those that depend on the vehicle, the driving styles, road conditions, and/or other criteria to create unique navigation maps that are each specific to a particular vehicle, a particular vehicle platform, a particular driver, particular driving styles, or the like. Each unique navigation map reflects/incorporates a different energy consumption profile.

The server can thus then obtain a navigation map using the GPS traces that includes edges and edge metadata obtained using the trace metadata; obtain a policy using the navigation map to obtain an activation action of the engine of an HEV; and transmit the policy to the HEV. The HEV can use the policy for at least one of engine activation planning or route planning. Engine activation planning using the policy can to reduce an energy expenditure of the battery of the HEV. Engine activation planning using the policy can be to reduce a total noise level associated with activating the engine of the HEV. Route planning can be to reduce at least one of an energy expenditure of the battery of the HEV or reducing a total noise level associated with activating the engine of the HEV.

A learned navigation map from multiple HEVs enables planning when a driver drives on a new road that the driver never traversed before because the engine activation planner can still plan based on the average person's driving patterns. The planner can also plan activation actions on roads explored at least once by the driver, because the battery, noise, etc. averages can be very accurate, even if the probability (Pr) of traversal is sparse at first. The server can also validate, prune, combine, and average semantically-labeled GPS traces to ensure security and efficiency for a fleet of HEVs and groups of customers/drivers.

Figure 13:
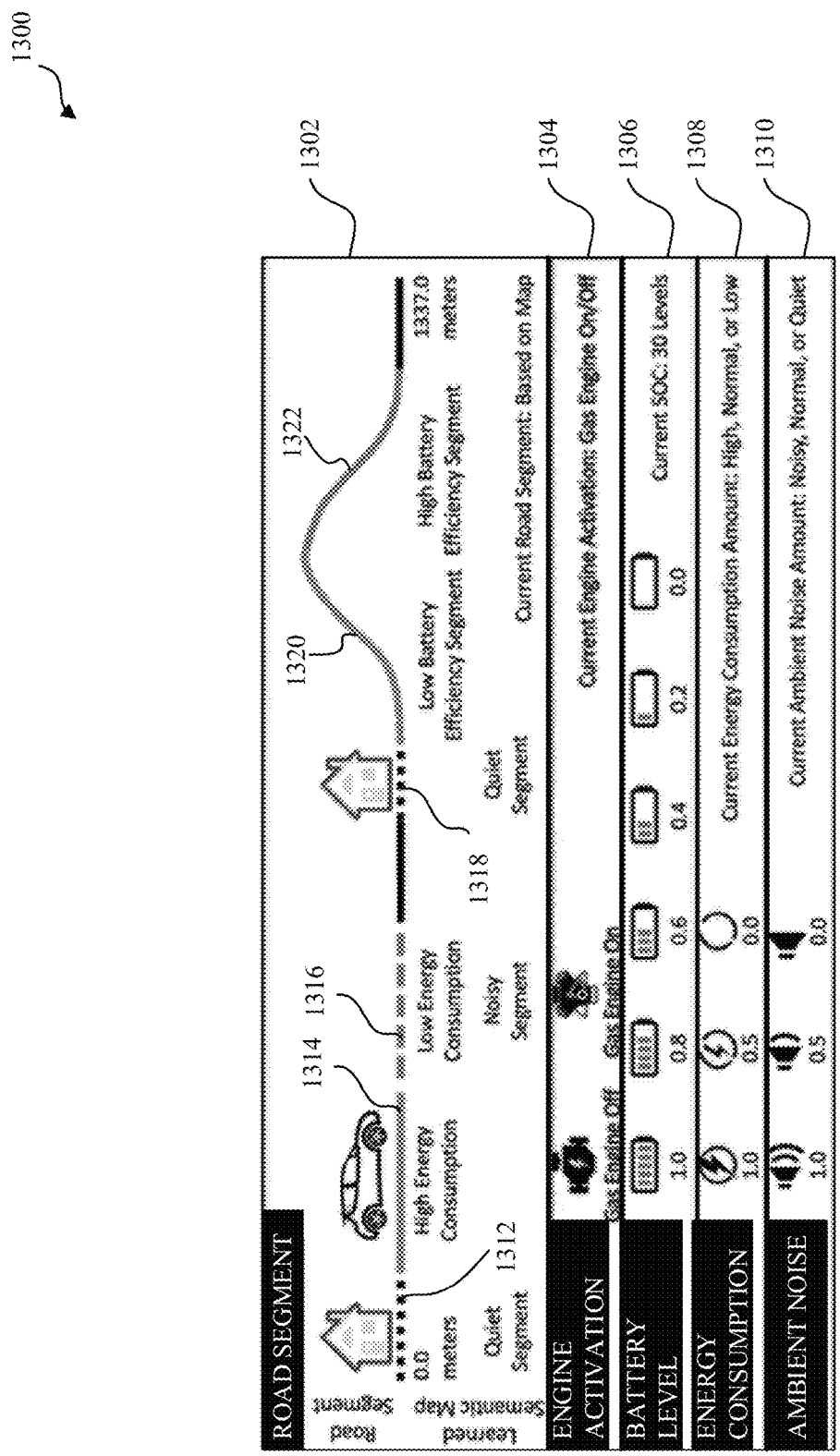
FIG. 13 graphically illustrates an example of a state space according to implementations of this disclosure.

FIG. 13 graphically illustrates an example of a state space 1300 according to implementations of this disclosure. While certain metadata and respective (possible) values are described with respect to the example 1300, in other examples, more, fewer, other parameters and respective possible values, or a combination thereof can be available.

As mentioned above, the state space can defined as $S=S_e \times S_{bl} \times S_{es}$. $S_e$ can be the set of edges of a navigation map and corresponding metadata. The navigation map can be a fixed map, a learned navigation map, or a combination thereof (e.g., an initially fixed map that can be improved with learning).

A swim lane 1302 illustrates (learned) road segments of the navigation map. A segment 1312, which may be a residential area, is described in the navigation map as a "Quiet" segment (e.g., the ambient noise in the segment 1312 is low); a segment 1314, which may be a highway, is described in the navigation map as a "High Energy Consumption" segment; a segment 1316, which may be a congested city street, is described in the navigation map as a "Low Energy Consumption" and "Noisy" segment; a segment 1318, which may be also be a residential area, is described in the navigation map as a "Quiet" segment; a segment 1320, which may be an uphill segment, is described in the navigation map as a "Low Battery Efficiency" segment; and a segment 1322, which may be a downhill segment, is described in the navigation map as a "High Battery Efficiency" segment.

A swim lane 1304 describes possible values of the current engine status $S_{es}$, which are "Engine Off" and "Engine On." A swim lane 1306 describes possible values of the current battery level $S_{bl}$. In an example, and as mentioned above, the battery level can be discretized, such as into 30 values.

A swim lane 1308 describes possible energy consumption levels on a road segment of the navigation map. The example 1300 illustrates that the values can be one of (High, Normal, Low) or 1.0, 0.5, and 0.0, which indicate High, Normal, and Low, respectively. However, other energy consumption values can be used. In an example, actual (e.g., averaged) consumption values can be used.

A swim lane 1310 describes possible ambient noise levels on a road segment of the navigation map. The example 1300 illustrates that the values can be one of (Noisy, Normal, Quiet) or 1.0, 0.5, and 0.0, which indicate Noisy, Normal, and Quiet, respectively. However, other ambient noise levels can be used. In an example, actual (e.g., averaged) ambient noise values (measured in dB) can be used.

Figure 14:
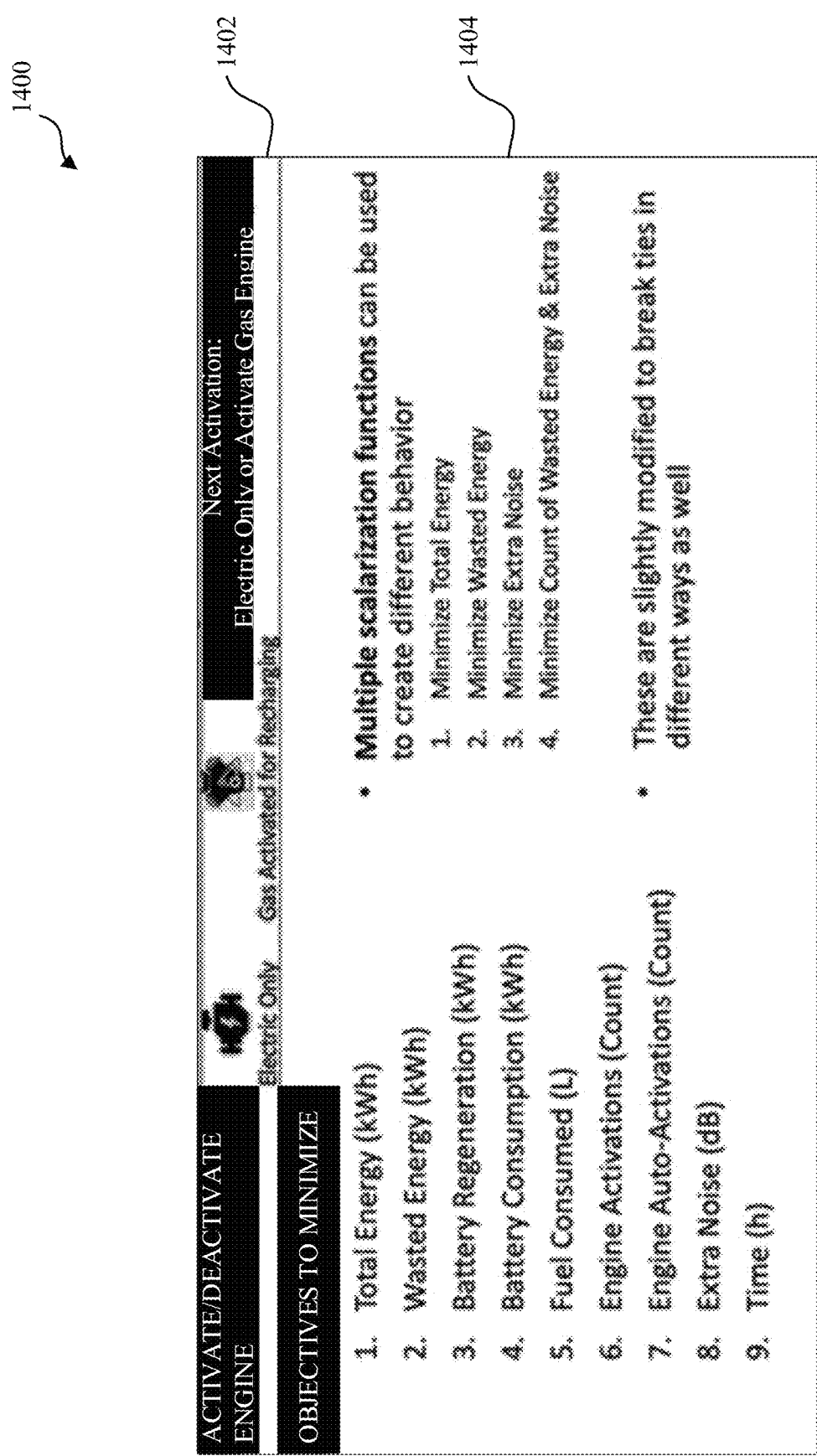
FIG. 14 graphically illustrates an example of an action space and costs/objective according to implementations of this disclosure.

FIG. 14 graphically illustrates an example 1400 of an action space and costs/objective according to implementations of this disclosure. A swim lane 1402 illustrates that the action space A includes a first action "Electric only," which corresponds to the activation action of not turning on or turning off the gas engine; and a second action "Gas Activated for Recharging," which corresponds to the activation action of turning on the gas engine.

A swim lane 1404 illustrates an example of objectives that can be minimized. As mentioned above, the objectives can be scalarized. Different scalarization functions can be used, depending on the desired optimization (e.g., minimizing total energy, minimizing wasted energy, minimizing extra noise, minimizing wasted energy and extra noise, and the like). Different combinations of the objectives can be used resulting a highly customizable optimization.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method of route planning for a hybrid electric vehicle (HEV), comprising:
obtaining a route between an origin and a destination,
wherein the route is optimized for at least one of a noise level or energy consumption of an engine of the HEV that is used to charge a battery of the HEV,
wherein the route is obtained using a model that maps current states of a state space to actions of an action space according to a policy,
wherein obtaining the route includes obtaining respective engine activation actions for at least some segments of the route,
wherein the policy provides an engine activation action for a next road segment subsequent to a current road segment given a current state, and
wherein the current state includes whether an entertainment system of the HEV is turned on and the action includes to increase a volume of the entertainment system to mask an action of activating the engine; and
controlling the HEV to follow the segments of the route and to activate the engine according to the respective engine activation actions.

2. The method of claim 1, wherein the route is obtained using engine activation rules comprising maintaining homeostasis within a range.

3. The method of claim 1, wherein the model is a multi-objective stochastic shortest path (MOSSP).

4. The method of claim 3, wherein the state space further includes a navigation map that includes the current road segment of the HEV, a current charge level of the battery, and whether the engine is currently on or off.

5. The method of claim 1, wherein the destination is determined stochastically.

6. The method of claim 1, further comprising:
receiving, from a driver of the HEV, an optimization criterion for the route, wherein the optimization criterion relates to one the noise level or the energy consumption.

7. The method of claim 1, wherein the route is optimized using a scalarization function of time, the noise level, and a battery level.

8. The method of claim 1, wherein the route is optimized by minimizing an objective related to time constrained by at least one of noise level or battery level.

9. The method of claim 1, wherein the route is optimized by minimizing an objective related to battery level constrained by at least one of time or the noise level.

10. The method of claim 1, wherein the route is optimized by minimizing an objective related to noise level constrained by at least one of time or battery level.

11. The method of claim 1, wherein obtaining the route between the origin and the destination comprises:
in anticipation of upcoming road segments resulting in regenerative energy that charges the battery, not turning on the engine.

12. An apparatus for driver assistance in a hybrid electric vehicle (HEV), comprising:
a battery;
an engine; and
a processor configured to:
when a driver assistance feature of the HEV is enabled and a destination of the HEV is not known, determine, using a policy of a Markov decision process a next road segment subsequent to a current road segment for the HEV and an engine activation action,
wherein the policy maps states to actions,
wherein a current state of the states includes the current road segment,
wherein an action of the actions includes the next road segment and the engine activation action,
wherein the Markov decision process uses a cost function that represents an expected immediate cost of performing the engine activation action in the current state, and
wherein the cost function includes a determination of at least one of a wasted energy indicating an amount of energy regenerated beyond a capacity of the battery on, or
a toggling of the engine between an off state and an on state; and
in response to the next road segment being followed by the HEV, activate the engine according to the engine activation action, wherein the engine activation action is selected from a set comprising a first activation action of turning the engine on and a second activation action of turning the engine off, and the first activation action causes the engine to turn on to charge the battery of the HEV.

13. The apparatus of claim 12, wherein the state further includes a navigation map including the current road segment of the HEV, a current charge level of the battery, and whether the engine is currently on or off.

14. A non-transitory computer-readable storage medium, comprising executable instructions that, when executed by a processor, facilitate performance of operations for route planning in a hybrid electric vehicle (HEV), comprising:
obtaining a route between an origin and a destination,
wherein the route is optimized for at least one of a noise level or energy consumption of an engine of the HEV that is used to charge a battery of the HEV,
wherein the route is obtained using a model that maps current states of a state space to actions of an action space according to a policy,
wherein obtaining the route includes obtaining respective engine activation actions for at least some segments of the route,
wherein the policy provides an engine activation action for a next road segment subsequent to a current road segment given a current state, and
wherein the current state includes whether an entertainment system of the HEV is turned on and the action includes to increase a volume of the entertainment system to mask an action of activating the engine; and
controlling the HEV to follow the segments of the route and to activate the engine according to the respective engine activation actions.

15. The non-transitory computer-readable storage medium of claim 14, wherein the route is obtained using engine activation rules comprising maintaining homeostasis within a range.

16. The non-transitory computer-readable storage medium of claim 14, wherein the state space further includes a navigation map that includes the current road segment of the HEV, a current charge level of the battery, and whether the engine is currently on or off.

17. The non-transitory computer-readable storage medium of claim 14, wherein the operations further comprise:

receiving, from a driver of the HEV, an optimization criterion for the route, wherein the optimization criterion relates to one the noise level or the energy consumption.

18. The non-transitory computer-readable storage medium of claim 14, wherein the route is optimized by minimizing an objective related to battery level constrained by at least one of time or the noise level.

19. The non-transitory computer-readable storage medium of claim 14, wherein the route is optimized by minimizing an objective related to noise level constrained by at least one of time or battery level.

20. The non-transitory computer-readable storage medium of claim 14, wherein obtaining the route between the origin and the destination comprises:
   in anticipation of upcoming road segments resulting in regenerative energy that charges the battery, not turning on the engine.

* * * * *